United States Patent
Uemura et al.

(10) Patent No.: US 9,951,236 B2
(45) Date of Patent: Apr. 24, 2018

(54) AQUEOUS PIGMENT DISPERSION AND AQUEOUS INK FOR INKJET RECORDING USE

(71) Applicant: DIC CORPORATION, Tokyo (JP)

(72) Inventors: Yukie Uemura, Takaishi (JP); Toshihisa Kimura, Kita-adachi-gun (JP); Yasuo Oji, Takaishi (JP); Hisakazu Tanaka, Takaishi (JP); Nobuhiro Oe, Takaishi (JP); Morio Sato, Komaki (JP); Ryuuji Yokoyama, Kamisu (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/035,007

(22) PCT Filed: Oct. 30, 2014

(86) PCT No.: PCT/JP2014/078899
§ 371 (c)(1),
(2) Date: May 6, 2016

(87) PCT Pub. No.: WO2015/072339
PCT Pub. Date: May 21, 2015

(65) Prior Publication Data
US 2016/0264799 A1 Sep. 15, 2016

(30) Foreign Application Priority Data

Nov. 14, 2013 (JP) .................................. 2013-235860
Feb. 6, 2014 (JP) .................................. 2014-021238

(51) Int. Cl.
*C09D 11/107* (2014.01)
*B41J 2/01* (2006.01)
(Continued)

(52) U.S. Cl.
CPC ......... *C09D 11/107* (2013.01); *B01J 19/0093* (2013.01); *B41J 2/01* (2013.01);
(Continued)

(58) Field of Classification Search
USPC .......................................................... 523/160
See application file for complete search history.

(56) References Cited

U.S. PATENT DOCUMENTS 5,085,698 A * 2/1992 Ma ........................ C09D 11/326
524/388
5,221,334 A 6/1993 Ma et al.
(Continued)

FOREIGN PATENT DOCUMENTS

CN 1651525 A 8/2005
EP 0819738 A1 1/1998
(Continued)

OTHER PUBLICATIONS

Search Report dated Feb. 3, 2015, issued in counterpart International Application No. PCT/JP2014/078899 (2 pages), Jan. 13, 2017.
(Continued)

*Primary Examiner* — Vu A Nguyen
(74) *Attorney, Agent, or Firm* — Westerman, Hattori, Daniels & Adrian, LLP

(57) ABSTRACT

Disclosed are an aqueous pigment dispersion and an aqueous ink for inkjet recording each of which includes a polymer (A), a pigment, and water. The polymer (A) has an anionic group, has a solubility in water of 0.1 g/100 mL or less and a number average molecular weight within the range of 1,000 to 6,000, and forms fine particles in water when the degree of neutralization of the anionic groups with the basic compound is 100%. Preferably, the polymer (A) is (Continued)

a polymer represented by general formula (1) (in formula (1), $A^1$ represents an organic lithium initiator residue, $A^2$ represents a polymer block of a monomer having an aromatic ring or a heterocycle, $A^3$ is a polymer block containing an anionic group, n represents an integer of 1 to 5, and B represents an aromatic group or an alkyl group).

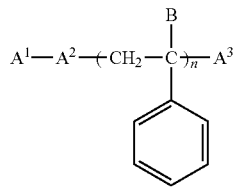

(1)

7 Claims, 1 Drawing Sheet

(51) Int. Cl.

| | |
|---|---|
| C09D 11/326 | (2014.01) |
| C08F 297/02 | (2006.01) |
| C09D 17/00 | (2006.01) |
| B41J 2/165 | (2006.01) |
| C09D 11/322 | (2014.01) |
| B01J 19/00 | (2006.01) |

(52) U.S. Cl.
CPC .............. *B41J 2/165* (2013.01); *C08F 297/02* (2013.01); *C08F 297/026* (2013.01); *C09D 11/322* (2013.01); *C09D 11/326* (2013.01); *C09D 17/00* (2013.01)

(56) References Cited

U.S. PATENT DOCUMENTS

| | | | |
|---|---|---|---|
| 5,272,201 A | 12/1993 | Ma et al. | |
| 5,288,826 A | 2/1994 | Yamamoto et al. | |
| 5,541,261 A | 7/1996 | Fock et al. | |
| 5,760,124 A * | 6/1998 | Listigovers | .......... C09D 11/326 |
| | | | 106/31.13 |
| 7,812,067 B2 * | 10/2010 | Doumaux | .............. C09D 11/30 |
| | | | 106/31.28 |
| 2005/0075418 A1 | 4/2005 | Nishiguchi | |
| 2007/0232723 A1 | 10/2007 | Arakawa | |
| 2008/0094457 A1 | 4/2008 | Doumaux et al. | |
| 2011/0166282 A1 | 7/2011 | Dire et al. | |
| 2011/0223529 A1 | 9/2011 | Shimanaka et al. | |
| 2012/0050391 A1 | 3/2012 | Nishiguchi et al. | |

FOREIGN PATENT DOCUMENTS

| | | |
|---|---|---|
| EP | 1193301 A1 | 4/2002 |
| EP | 2330154 A1 | 6/2011 |
| EP | 3031838 A1 | 6/2016 |
| JP | 5-214031 A | 8/1993 |
| JP | 6-136311 A | 5/1994 |
| JP | 8-183920 A | 7/1996 |
| JP | 10-7955 A | 1/1998 |
| JP | 10-182707 A | 7/1998 |
| JP | 2005-133089 A | 5/2005 |
| JP | 2005-194487 A | 7/2005 |
| JP | 2006-083277 A | 3/2006 |
| JP | 2007-238949 A | 9/2007 |
| JP | 7-224112 A | 10/2007 |
| JP | 2008-195769 A | 8/2008 |
| JP | 2008-208153 A | 9/2008 |
| JP | 2010-180353 A | 8/2010 |
| JP | 2012-072356 A | 4/2012 |
| JP | 2013-993 A | 1/2013 |
| WO | 2010/013651 A1 | 2/2010 |

OTHER PUBLICATIONS

International Search Report dated Mar. 3, 2015, issued in International Application No. PCT/JP2014/081447, counterpart of U.S. Appl. No. 15/032,891.
Gradzielski et al., "Small-Angle Neutron Scattering from Diffuse Interfaces. 2. Polydisperse Shells in Water-n-Alkane-C10E4 Microemulsions", Journal of Physical Chemistry, 1995, pp. 13232-13238.
Liu et al., "Synthesis and Dispersion Properties of Block Copolymer PS-b-PAA", Journal of Beijing Technology and Business University, vol. 24 No. 1, 2006, pp. 5-9, with translation.
Heinen et al., "Phase Behavior of Amphiphilic Diblock Co-oligomers with Nonionic and Ionic Hydrophilic Groups", The Journal of Physical Chemistry, vol. 117, No. 10, 2013, pp. 3005-3018.
Ganeva et al., "Particle Formation in ab Initio RAFT Mediated Emulsion Polymerization Systems", Macro molecules, vol. 40, No. 17, 2007, pp. 6181-6189.

* cited by examiner

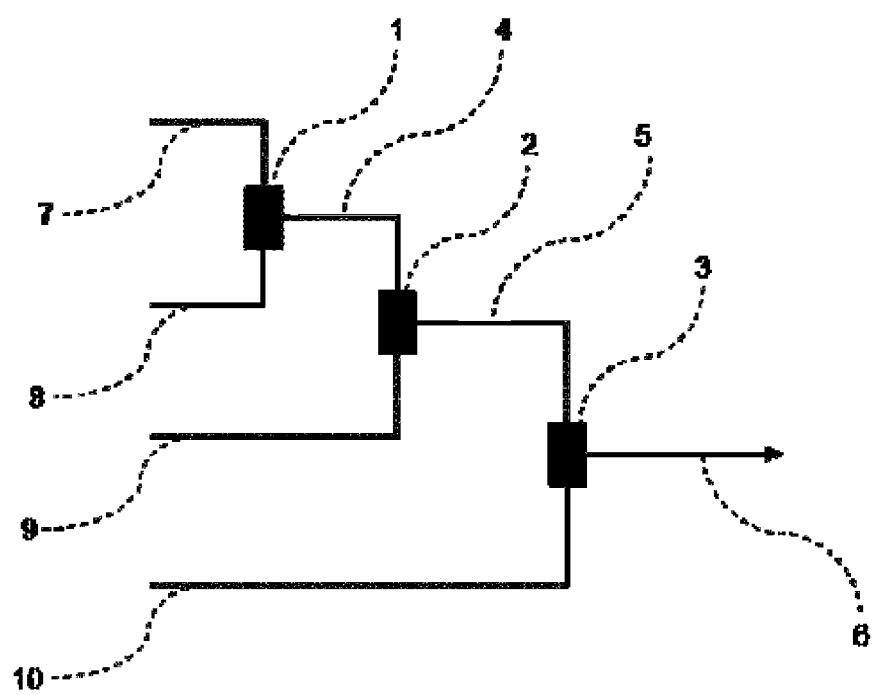

AQUEOUS PIGMENT DISPERSION AND AQUEOUS INK FOR INKJET RECORDING USE

TECHNICAL FIELD

The present invention relates to an aqueous pigment dispersion and an aqueous ink for inkjet recording using the same.

BACKGROUND ART

Pigment compositions use pigments having excellent light fastness as coloring materials, and utilization of the excellent light fastness of the pigments allows the pigment compositions to be used in various indoor and outdoor applications such as the field of coatings for automobiles and buildings, the field of printing inks such as offset inks, gravure inks, flexographic inks, and silk screen inks, and the field of aqueous inks for inkjet recording.

Among the pigment compositions, aqueous inks that use water as their main solvent have an advantageous feature in that the risk of fire, which is high for solvent inks, can be reduced. Such aqueous inks are the mainstream of inks particularly for inkjet recording.

A pigment is insoluble in water and is used as an aqueous pigment dispersion prepared by dispersing the pigment in an aqueous medium. Accordingly, methods for stably dispersing a pigment in an aqueous medium have been studied.

Known examples of such methods include: a method including well-mixing a synthetic resin having a specific acid value, a base, and a coloring agent using an agitator or a dispersing device in the presence of an organic solvent such as a ketone-based solvent or an alcohol-based solvent to dissolve or disperse the coloring agent and render the synthetic resin self-water dispersible and then mixing the colored resin solution with an aqueous medium to disperse small droplets of the self-water dispersible resin solution containing the coloring agent in the aqueous medium (see, for example, paragraph 0024 in PTL 1 and paragraph 0025 in PTL 2); a method in which a block polymer compound having a hydrophobic segment and a hydrophilic segment including hydrophobic units and hydrophilic units is used as a pigment dispersant (see, for example, PTL 3); and a method in which an (An-Bm) block polymer is used as a pigment dispersant, the (An-Bm) block polymer being an A-B block polymer wherein A is styrene, B is acrylic acid, the degree of polymerization of A is about 5 to about 50, and the degree of polymerization of B is about 70 to about 800 (see, for example, PTL 4).

One challenge of an aqueous pigment dispersion is to reduce the amount of coarse particles that may be formed in the dispersion. The coarse particles are particles having diameters much larger than the average particle diameter of the aqueous pigment dispersion obtained and may be aggregates of undispersed particles of the pigment and debris of the pigment formed during dispersion or aggregates of the polymer used as a pigment dispersant.

The coarse particles inhibit the formation of a uniform coating surface during coating or printing. In a printing method in which an ink such as an aqueous ink for inkjet recording is ejected from nozzles of an inkjet head, the coarse particles cause clogging of the nozzles. Particularly, since the resolution of inkjet printers is increasing in recent years, the density of nozzles of inkjet heads is increasing, and the size of liquid droplets is decreasing. In other words, the diameter of the nozzles for ejecting the ink is decreasing, and their density is increasing (see, for example, PTL 5). As the diameter of the nozzles decreases, the allowable size of foreign matter decreases, and this causes an increase in the frequency of the occurrence of clogging of the nozzles. Specifically, a problem occurs in that inks applicable to conventional inkjet printers cannot be used for a printer equipped with a newly developed high-resolution inkjet head.

The method described in PTL 1 is a good method for producing an aqueous ink for inkjet recording. However, in order to provide an ink that can cope with a reduction in the diameter of nozzles and an increase in their degree of integration in recent years, there is still room for consideration.

CITATION LIST

Patent Literature

PTL 1: Japanese Unexamined Patent Application Publication No. 8-183920
PTL 2: Japanese Unexamined Patent Application Publication No. 2007-238949
PTL 3: Japanese Unexamined Patent Application Publication No. 2008-195769
PTL 4: Japanese Unexamined Patent Application Publication No. 10-7955
PTL 5: Japanese Unexamined Patent Application Publication No. 2013-993

SUMMARY OF INVENTION

Technical Problem

An object of the present invention is to provide an aqueous pigment dispersion used to provide an aqueous ink for inkjet recording that contains a reduced amount of coarse particles, is therefore excellent in ejection stability, and is applicable to a printer equipped with a high-resolution inkjet head. A further object is to provide an aqueous ink for inkjet recording that uses the aqueous pigment dispersion.

Solution to Problem

The present inventors have thought that, when a resin used as a main raw material of an aqueous pigment dispersion has appropriately balanced solubility in water, high adsorptive power for the pigment is achieved and high dispersibility can thereby be achieved. The inventors have conducted studies on the appropriately balanced solubility, i.e., dissolution behavior in water when the anionic groups are not neutralized and dissolution behavior in water when the anionic groups are neutralized with a basic compound at a degree of neutralization of 100%. As a result of the studies, the inventors have found that the above objects can be achieved by an aqueous pigment dispersion prepared by the method described in PTL 1 and PTL 2 using a polymer that has a specific number average molecular weight, has a very low solubility in water although the polymer has anionic groups, and forms fine particles when the degree of neutralization of the anionic groups with a basic compound is 100%.

Accordingly, the present invention provides an aqueous pigment dispersion including a pigment, water, and a polymer (A) that has an anionic group, has a solubility in water of 0.1 g/100 mL or less and a number average molecular weight within the range of 1,000 to 6,000, and forms fine particles in water when the degree of neutralization of the anionic group with a basic compound is 100%.

The present invention also provides an aqueous ink for inkjet recording that uses the above-described aqueous pigment dispersion.

The present invention also provides a method of producing an aqueous pigment dispersion. The method includes the successive steps of: obtaining a dispersion containing a polymer having an anionic group, a basic compound, a water-soluble organic solvent, and a pigment; and mixing water with the dispersion. In the aqueous pigment dispersion production method, the polymer having the anionic group is a polymer (A) having the anionic group, having a solubility in water of 0.1 g/100 mL or less and a number average molecular weight within the range of 1,000 to 6,000, and forms fine particles in water when the degree of neutralization of the anionic group with the basic compound is 100%.

Advantageous Effects of Invention

According to the present invention, a pigment dispersion containing a reduced amount of coarse particles and excellent in ejection stability and an aqueous ink for inkjet recording that uses the pigment dispersion can be obtained.

DESCRIPTION OF EMBODIMENTS (Polymer (A))

The polymer (A) used in the present invention has a solubility in water of 0.1 g/100 mL or less and a number average molecular weight within the range of 1,000 to 6,000 and forms fine particles in water when the degree of neutralization of anionic groups with a basic compound is 100%.

(Solubility in Water)

In the present invention, the solubility of the polymer (A) in water is defined as follows. Specifically, 0.5 g of the polymer screened using sieves with mesh sizes of 250 μm and 90 μm so that its particle diameter falls within the range of 250 μm to 90 μm is sealed in a bag produced from a 400-mesh wire net, immersed in 50 mL of water, and left under mild stirring at a temperature of 25° C. for 24 hours. After immersion for 24 hours, the 400-mesh wire net with the polymer sealed therein is dried in a dryer set at 110° C. for 2 hours to dry the polymer. The change in weight of the 400-mesh wire net with the polymer sealed therein before and after immersion in water is measured, and the solubility is computed using the following formula.

Solubility (g/100 mL)=(polymer-sealed 400-mesh wire net before immersion (g)−polymer-sealed 400-mesh wire net after immersion (g))×2  [Formula 1]

(Fine Particles)

In the present invention, whether or not fine particles are formed in water when the degree of neutralization of the anionic groups with the basic compound is 100% is determined as follows.

(1) The acid value of the polymer is measured in advance using an acid value measurement method according to JIS test method K 0070-1992. Specifically, 0.5 g of the polymer is dissolved in a tetrahydrofuran (hereinafter may be referred to as THF) solvent, and titration with a 0.1M alcoholic potassium hydroxide solution is performed using phenolphthalein as an indicator to determine the acid value.

(2) 1 g of the polymer is added to 50 mL of water, and a 0.1 mol/L aqueous potassium hydroxide solution is added in an amount sufficient to completely neutralize the polymer with the above-determined acid value to thereby obtain a completely neutralized polymer.

(3) The completely neutralized solution is subjected to ultrasonic waves at a temperature of 25° C. for 2 hours using an ultrasonic cleaner (ultrasonic cleaner US-102, SND Co., Ltd., 38 kHz, self-excited oscillation) and is then left to stand at room temperature for 24 hours.

After the solution is left to stand for 24 hours, a sample solution is sampled at a depth of 2 cm from the surface of the solution. Then, using a dynamic light scattering particle diameter distribution measurement device (dynamic light scattering particle diameter measurement device "Microtrac particle size distribution analyzer UPA-ST150" manufactured by NIKKISO Co., Ltd.), a determination is made as to whether or not information about light scattering due to formation of fine particles is obtained, whereby the presence or absence of fine particles is checked.

(Diameter of Fine Particles)

If the diameter of the fine particles obtained from the polymer (A) used in the present invention is excessively large, the polymer (A) may be unstable in water. Therefore, it is preferable that the particle diameter of the polymer (A) is not excessively large. The particle diameter is preferably within the range of 5 to 1,000 nm, more preferably within the range of 7 to 700 nm, and most preferably within the range of 10 to 500 nm. As the particle size distribution of the fine particles becomes narrower, the fine particles tend to exhibit better dispersibility. However, an embodiment in which the particle size distribution is wide is not excluded.

The particle diameter and the particle size distribution are measured using a dynamic light scattering particle diameter distribution measurement device (dynamic light scattering particle diameter measurement device "Microtrac particle size distribution analyzer UPA-ST150" manufactured by NIKKISO Co., Ltd.) in the same manner as in the determination method for the fine particles described above.

(Degree of Neutralization of Polymer (A))

The degree of neutralization of the polymer (A) used in the present invention is determined using the following formula.

Degree of neutralization (%)=((mass (g) of basic compound×56×1,000)/(acid value (mg KOH/g) of polymer (A)×equivalent of basic compound× mass (g) of polymer (A)))×100  [Formula 2]

The acid value of the polymer (A) is measured according to JIS test method K 0070-1992. Specifically, 0.5 g of a sample is dissolved in a THF solvent, and titration with a 0.1M alcoholic potassium hydroxide solution is performed using phenolphthalein as an indicator to determine the acid value.

(Number Average Molecular Weight of Polymer (A))

The number average molecular weight of the polymer (A) used in the present invention is 1,000 to 6,000. As described above, the resin in the present invention has a low solubility in water, i.e., 0.1 g/100 mL or less. Therefore, when the polymer (A) has a relatively high molecular weight, a precipitate may be formed when the polymer (A) is dispersed in water even though the polymer (A) is neutralized with the basic compound. In addition, the penetrability of the polymer (A) into pigment aggregates becomes low, and its ability to disintegrate the pigment aggregates tends to become low, so that the pigment cannot be dispersed easily.

If the number average molecular weight is less than 1,000, the stability of the aqueous pigment dispersion obtained may deteriorate.

From this point of view, it is preferable that the polymer (A) has a low molecular weight. Particularly, the number average molecular weight of the polymer (A) is more preferably 1,300 to 5,000 and most preferably 1,500 to 4,500.

In the present invention, the number average molecular weight is a polystyrene-equivalent value measured by GPC (gel permeation chromatography) and is specifically a value measured under the conditions described below.

(Method of Measuring Number Average Molecular Weight (Mn))

The measurement is performed by gel permeation chromatography (GPC) under the following conditions.

Measurement device: High performance GPC ("HLC-8220GPC" manufactured by TOSOH Corporation)

Columns: The following columns manufactured by TOSOH Corporation are connected in series and used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (refractive index detector)
Column temperature: 40° C.
Eluent: Tetrahydrofuran (THF)
Flow rate: 1.0 mL/min
Injection amount: 100 μL (THF solution with a sample concentration of 0.4% by mass)

Standard samples: The following polystyrene standards are used to produce a calibration curve.

(Polystyrene Standards)

"TSKgel standard polystyrene A-500" manufactured by TOSOH Corporation
"TSKgel standard polystyrene A-1000" manufactured by TOSOH Corporation
"TSKgel standard polystyrene A-2500" manufactured by TOSOH Corporation
"TSKgel standard polystyrene A-5000" manufactured by TOSOH Corporation
"TSKgel standard polystyrene F-1" manufactured by TOSOH Corporation
"TSKgel standard polystyrene F-2" manufactured by TOSOH Corporation
"TSKgel standard polystyrene F-4" manufactured by TOSOH Corporation
"TSKgel standard polystyrene F-10" manufactured by TOSOH Corporation
"TSKgel standard polystyrene F-20" manufactured by TOSOH Corporation
"TSKgel standard polystyrene F-40" manufactured by TOSOH Corporation
"TSKgel standard polystyrene F-80" manufactured by TOSOH Corporation
"TSKgel standard polystyrene F-128" manufactured by TOSOH Corporation
"TSKgel standard polystyrene F-288" manufactured by TOSOH Corporation
"TSKgel standard polystyrene F-550" manufactured by TOSOH Corporation (Surface Tension)

An aqueous resin dispersion containing the polymer (A) used in the present invention can have a surface tension of about 70 dyn/cm, which is close to the surface tension of water. It is expected that the higher the surface tension of the pigment dispersant, the more easily the surface tension of the pigment dispersion obtained can be maintained at a certain level or higher. When the polymer used is a water-soluble polymer that has a high solubility in water and does not form fine particles even when the degree of neutralization of the anionic groups with the basic compound is 100%, the surface tension of the aqueous polymer solution tends to be very low. In the present invention, it is preferable that the surface tension of the aqueous resin dispersion obtained using the polymer (A) is 30 dyn/cm or more, and it is more preferable that the surface tension of the polymer (A) is 40 dyn/cm or more. The surface tension is a value measured on a completely neutralized resin solution prepared by adding 1 g of the polymer (A) and then adding a 0.1 mol/L aqueous potassium hydroxide solution in an amount sufficient to neutralize the polymer completely.

No particular limitation is imposed on the polymer (A), so long as it is a polymer that, as described above, is insoluble or poorly soluble in water used as a main solvent of the pigment dispersion when not neutralized, forms fine particles when completely neutralized, and contains, in addition to the hydrophilic anionic groups, a hydrophobic group in its molecule.

Examples of such a polymer include a block polymer including a polymer block having a hydrophobic group and a polymer block having an anionic group. However, when the polymer is a block polymer that has a solubility in water of more than 0.1 g/100 mL or does not form fine particles when the degree of neutralization of the anionic groups with the basic compound is 100%, the effects of the present invention are not obtained.

The number of hydrophobic groups and the number of anionic groups are as follows. When the number of anionic groups is excessively large, it is highly probable that the solubility in water exceeds 0.1 g/100 mL or fine particles are not formed even when the degree of neutralization of the anionic groups with the basic compound is 100%. From this point of view, it is preferable that the number of anionic groups is not excessively high. In a polymer, the number of anionic groups and the solubility in water are not necessarily determined by the acid value of the polymer and the number of anionic groups in the design phase of the polymer. For example, among polymers having the same acid value, a polymer having a low molecular weight tends to have a high solubility in water, and a polymer having a high molecular weight tends to have a low solubility in water. Therefore, in the present invention, the polymer (A) is identified by its solubility in water.

The polymer (A) may be a homopolymer but is preferably a copolymer. The polymer (A) may be a random polymer, a block polymer, or an alternate polymer and is preferably a block polymer. The polymer may be a branched polymer but is preferably a linear polymer.

It is preferable in terms of design flexibility that the polymer (A) is a vinyl polymer. To produce a vinyl polymer having the molecular weight and solubility characteristics desired in the present invention, it is preferable to use a production method using "living polymerization" such as living radical polymerization, living cationic polymerization, or living anionic polymerization.

Particularly, it is preferable that the polymer (A) is a vinyl polymer produced using a (meth) acrylate monomer as one of raw materials. The method of producing such a vinyl polymer is preferably living radical polymerization or living anionic polymerization. Living anionic polymerization is preferred from the viewpoint that the molecular weight and each segment of the block polymer can be more precisely designed.

(Polymer (A) Produced by Living Anionic Polymerization)

Specifically, the polymer (A) produced by living anionic polymerization is a polymer represented by general formula (1).

[Chem. 1]

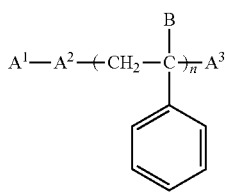

In formula (1), $A^1$ represents an organic lithium initiator residue, $A^2$ represents a polymer block of a monomer having an aromatic ring or a heterocycle, $A^3$ represents a polymer block containing an anionic group, n represents an integer of 1 to 5, and B represents an aromatic group or an alkyl group.

In general, formula (1), $A^1$ represents an organic lithium initiator residue. Specific examples of the organic lithium initiator include: alkyl lithiums such as methyllithium, ethyllithium, propyllithium, butyllithiums (e.g., n-butyllithium, sec-butyllithium, iso-butyllithium, and tert-butyllithium), pentyllithium, hexyllithium, methoxymethyllithium, and ethoxymethyllithium; phenylalkylenelithiums such as benzyllithium, α-methylstyryllithium, 1,1-diphenyl-3-methylpentyllithium, 1,1-diphenylhexyllithium, and phenylethyllithium; alkenyllithiums such as vinyllithium, allyllithium, propenyllithium, and butenyllithium; alkynyllithiums such as ethynyllithium, butynyllithium, pentynyllithium, and hexynyllithium; aryllithiums such as phenyllithium and naphthyllithium; heterocyclic lithiums such as 2-thienyllithium, 4-pyridyllithium, and 2-quinolyllithium; and alkyl lithium-magnesium complexes such as tri(n-butyl)magnesium lithium and trimethyl magnesium lithium.

With the organic lithium initiator, the bond between the organic group and lithium is cleaved, and an active end is formed in the organic group, so that polymerization starts from the active end. Therefore, the organic group originating from the organic lithium is bonded to an end of the polymer obtained. In the present invention, the organic group originating from the organic lithium and bonded to the end of the polymer is referred to as the organic lithium initiator residue. For example, in a polymer with methyllithium used as the initiator, the organic lithium initiator acid group is a methyl group. In a polymer with butyllithium used as the initiator, the organic lithium initiator acid group is a butyl group.

In general formula (1) above, $A^2$ represents a polymer block having a hydrophobic group. $A^2$ is a group for the purpose of obtaining appropriate solubility balance as described above and is preferably a group that exhibits high adsorptive power for the pigment when in contact with the pigment. From this point of view, it is preferable that $A^2$ is a polymer block of a monomer having an aromatic ring or a heterocycle.

Specifically, the polymer block of a monomer having an aromatic ring or a heterocycle is a homopolymer or copolymer block obtained by homopolymerization or copolymerization of a monomer having an aromatic ring such as a styrene-based monomer or a monomer having a heterocycle such as a vinylpyridine-based monomer.

Examples of the monomer having an aromatic ring include: styrene-based monomers such as styrene, p-tert-butyldimethylsiloxystyrene, o-methylstyrene, p-methylstyrene, p-tert-butylstyrene, p-tert-butoxystyrene, m-tert-butoxystyrene, p-tert-(1-ethoxymethyl)styrene, m-chlorostyrene, p-chlorostyrene, p-fluorostyrene, α-methylstyrene, and p-methyl-α-methylstyrene; vinylnaphthalene; and vinylanthracene.

Examples of the monomer having a heterocycle include vinylpyridine-based monomers such as 2-vinylpyridine and 4-vinylpyridine.

These monomers may be used alone or in combination or two or more types.

In general formula (1) above, $A^3$ represents a polymer block containing an anionic group. $A^3$ is used for the purpose of providing appropriate solubility as described above and for the purpose of imparting dispersion stability in water when a pigment dispersion is formed.

Examples of the anionic group in the polymer block $A^3$ include a carboxyl group, a sulfonic acid group, and a phosphoric acid group. Of these, a carboxyl group is preferred because of the ease of preparation, a wide choice of monomer types, and availability. Two carboxyl groups in the same molecule or different molecules may undergo dehydration condensation to thereby form an acid anhydride group.

No particular limitation is imposed on the method of introducing the anionic group into $A^3$. For example, when the anionic group is a carboxyl group, $A^3$ may be a homopolymer or copolymer block (PB1) obtained by homopolymerization of (meth)acrylic acid or copolymerization of (meth)acrylic acid with another monomer or may be a polymer block (PB2) obtained by homopolymerizing a (meth)acrylate having a protecting group that can be reconverted into an anionic group by deprotection or copolymerizing this (meth)acrylate with another monomer to obtain a homopolymer or a copolymer and then reconverting part or all of the protecting groups that can be reconverted into anionic groups into the anionic groups.

The (meth)acrylic acid used for the polymer block $A^3$ is a generic term of acrylic acid and methacrylic acid, and the (meth)acrylate is a generic term of acrylate and methacrylate.

Specific examples of the (meth)acrylic acid and (meth)acrylate include (meth)acrylic acid, methyl (meth)acrylate, ethyl (meth)acrylate, iso-propyl (meth)acrylate, allyl (meth)acrylate, n-butyl (meth)acrylate, iso-butyl (meth)acrylate, sec-butyl (meth)acrylate, tert-butyl (meth)acrylate, n-amyl (meth)acrylate, iso-amyl (meth)acrylate, n-hexyl (meth) acrylate, n-octyl (meth)acrylate, 2-ethylhexyl (meth)acrylate, n-lauryl (meth) acrylate, n-tridecyl (meth) acrylate, n-stearyl (meth)acrylate, phenyl (meth)acrylate, benzyl (meth)acrylate, cyclohexyl (meth)acrylate, 4-tert-butylcyclohexyl (meth) acrylate, isobornyl (meth) acrylate, tricyclodecanyl (meth)acrylate, dicyclopentadienyl (meth)acrylate, adamantyl (meth) acrylate, glycidyl (meth) acrylate, tetrahydrofurfuryl (meth)acrylate, 2-methoxyethyl (meth) acrylate, 2-ethoxyethyl (meth) acrylate, dimethylaminoethyl (meth) acrylate, diethylaminoethyl (meth) acrylate, trifluoroethyl (meth) acrylate, tetrafluoropropyl (meth) acrylate, pentafluoropropyl (meth) acrylate, octafluoropentyl (meth) acrylate, pentadecafluorooctyl (meth) acrylate, heptadecafluorodecyl (meth) acrylate, N,N-dimethyl(meth)acrylamide, (meth)acryloylmorpholine, (meth) acrylonitrile, and polyoxyalkylene oxide group-containing (meth)acrylates such as polyethylene glycol (meth)acrylate, polypropylene glycol (meth) acrylate, polyethylene glycol-polypropylene glycol (meth) acrylate, polyethylene glycol-polybutylene glycol (meth)acrylate, polypropylene glycol-polybutylene glycol (meth) acrylate, methoxypolyethylene glycol (meth) acrylate, ethoxypolyethylene glycol (meth)acrylate, butoxypolyethylene glycol (meth)acrylate, octoxypolyethylene glycol (meth)acrylate, lauroxypolyethylene glycol (meth) acrylate, stearoxypolyethylene glycol (meth) acrylate, phenoxypolyethylene glycol (meth) acrylate, methoxypolypropylene glycol (meth)acrylate, and octoxypolyethylene glycol-polypropylene glycol (meth)acrylate. These monomers may be used alone or as a mixture of two or more types.

In the living anionic polymerization method, when the monomer used is a monomer having an active proton-containing group such as an anionic group, the active end of the living anionic polymerized polymer immediately reacts with the active proton-containing group and is thereby deactivated, so that no polymer is obtained. In living anionic polymerization, it is difficult to polymerize a monomer having an active proton-containing group without any treatment. Therefore, it is preferable to perform polymerization with the active proton-containing group protected and performing deprotection to reconvert the protecting group into the active proton-containing group.

For this reason, it is preferable that a monomer containing a (meth)acrylate having a protecting group that can be reconverted into an anionic group by deprotection is used for the polymer block $A^3$. The use of such a monomer for the polymerization described above can prevent inhibition of the polymerization. The anionic group protected by the protecting group can be reconverted into the anionic group by deprotection performed after a block polymer is obtained.

For example, when the anionic group is a carboxyl group, the carboxyl group is esterified. In a subsequent step, deprotection is performed through hydrolysis etc., whereby the esterified group can be reconverted into the carboxyl group. In this case, the protecting group that can be converted into the carboxyl group is preferably a group having an ester bond, and examples of such a group include: primary alkoxycarbonyl groups such as a methoxycarbonyl group, an ethoxycarbonyl group, a n-propoxycarbonyl group, and a n-butoxycarbonyl group; secondary alkoxycarbonyl groups such as an isopropoxycarbonyl group and a sec-butoxycarbonyl group; tertiary alkoxycarbonyl groups such as a t-butoxycarbonyl group; phenylalkoxycarbonyl groups such as a benzyloxycarbonyl group; and alkoxyalkylcarbonyl groups such as an ethoxyethylcarbonyl group.

Examples of the monomer useable when the anionic group is a carboxyl group include: alkyl (meth)acrylates such as methyl (meth)acrylate, ethyl (meth)acrylate, n-propyl (meth)acrylate, isopropyl (meth)acrylate, n-butyl (meth) acrylate, sec-butyl (meth)acrylate, isobutyl (meth) acrylate, t-butyl (meth)acrylate, 2-ethylhexyl (meth)acrylate, decyl (meth)acrylate, undecyl (meth)acrylate, dodecyl (meth) acrylate (lauryl (meth)acrylate), tridecyl (meth) acrylate, pentadecyl (meth)acrylate, hexadecyl (meth) acrylate, heptadecyl (meth)acrylate, octadecyl (meth)acrylate (stearyl (meth)acrylate), nonadecyl (meth)acrylate, and icosanyl (meth)acrylate; phenylalkylene (meth)acrylates such as benzyl (meth)acrylate; and alkoxyalkyl (meth)acrylates such as ethoxyethyl (meth)acrylate. One type of these (meth)acrylates (c1) may be used, or a combination of two or more types may be used. Of these (meth)acrylates (c1), t-butyl (meth)acrylate and benzyl (meth)acrylate are preferably used because their conversion reaction into a carboxyl group is easy. In view of industrial availability, t-butyl (meth) acrylate is more preferred.

In general formula (1), B represents an aromatic group or an alkyl group having 1 to 10 carbon atoms. n represents an integer of 1 to 5.

In the living anionic polymerization method, direct polymerization of a (meth)acrylate monomer at the active end of a highly nucleophilic styrene-based polymer may not proceed because of nucleophilic attack to carbonyl carbon, so that the (meth)acrylate monomer is not polymerized. Therefore, when the (meth)acrylate monomer is polymerized to the $A^1$-$A^2$ described above, a reaction control agent is used to control the nucleophilicity, and then the (meth) acrylate monomer is polymerized. B in general formula (1) is a group originating from the reaction control agent. Specific examples of the reaction control agent include diphenylethylene, α-methylstyrene, and p-methyl-α-methylstyrene.

(Living Anionic Polymerization Using Microreactor)

The living anionic polymerization method can be performed as a batch process used for conventional free radical polymerization by controlling the reaction conditions. A method in which a microreactor is used to perform polymerization continuously can also be used. The microreactor allows a polymerization initiator and a monomer to be mixed well, so that the reaction starts simultaneously in the microreactor. In addition, temperature is uniform within the microreactor, and a uniform polymerization rate is achieved, so that the polymer produced can have a narrow molecular weight distribution. In addition, it is easy to produce a block copolymer in which the components of the blocks are not mixed with each other because their growing ends are stable. Since the reaction temperature is well controlled, side reactions can be easily suppressed.

A general method of living anionic polymerization using a microreactor will be described with reference to FIG. 1 showing a schematic diagram of the microreactor. A first monomer and a polymerization initiator for initiating polymerization are introduced from tube reactors P1 and P2 (7 and 8 in FIG. 1) into a T-shaped micromixer M1 (1 in FIG. 1) including a flow passage in which a plurality of liquids can be mixed, and the first monomer is subjected to living anionic polymerization in the T-shaped micromixer M1 to thereby form a first polymer (step 1).

Next, the first polymer obtained is transferred to a T-shaped micromixer M2 (2 in FIG. 1), and a growing end of the obtained polymer is trapped with a reaction control agent introduced from a tube reactor P3 (9 in FIG. 1) to control the reaction (step 2).

In this case, the value of n in general formula (1) can be controlled by the type and amount used of the reaction control agent.

Next, the first polymer subjected to reaction control in the T-shaped micromixer M2 is transferred to a T-shaped micromixer M3 (3 in FIG. 3), and a second monomer introduced from a tube reactor P4 and the first polymer subjected to reaction control are subjected to living anionic polymerization continuously in the mixer M3 (step 3).

Then the reaction is quenched with an active proton-containing compound such as methanol, whereby a block copolymer is produced.

When the polymer (A) in the present invention represented by general formula (1) is produced using the microreactor described above, a monomer having an aromatic ring or a heterocycle is used as the first monomer, and an organic lithium initiator is used as the initiator to initiate the reaction, whereby a polymer block of the monomer having an aromatic ring or a heterocycle, i.e., $A^2$ described above, (an organic group, i.e., the organic lithium initiator residue $A^1$, is bonded to one end of the polymer block $A^2$) is obtained.

Next, the reaction control agent is used to control the reactivity of the growing end. Then a monomer containing a (meth)acrylate having a protecting group that can be reconverted into the anionic group is used as the second monomer and allowed to react to thereby obtain a polymer block.

Then a deprotection reaction such as hydrolysis is performed to reconvert the protecting groups into the anionic groups, and $A^3$ described above, i.e., a polymer block having the anionic groups, is thereby obtained.

A detailed description will be given of the method of reconverting the protecting group that can be reconverted into the anionic group into the anionic group by a deprotection reaction such as hydrolysis of the ester bond in the protecting group.

The hydrolysis reaction of the ester bond proceeds under acidic conditions and also under basic conditions, but the conditions vary depending on the type of group having an ester bond. For example, when the group having an ester bond is a primary alkoxycarbonyl group such as a methoxycarbonyl group or a secondary alkoxycarbonyl group such as an isopropoxycarbonyl group, a carboxyl group can be obtained by performing hydrolysis under basic conditions. Examples of a basic compound used to form the basic conditions in this case include metal hydroxides such as sodium hydroxide and potassium hydroxide.

When the group having an ester bond is a tertiary alkoxycarbonyl group such as a t-butoxycarbonyl group, a carboxyl group can be obtained by performing hydrolysis under acidic conditions. Examples of an acidic compound used to form the acidic conditions in this case include: mineral acids such as hydrochloric acid, sulfuric acid, and phosphoric acid; Bronsted acids such as trifluoroacetic acid; and Lewis acids such as trimethylsilyl triflate. The reaction conditions of hydrolysis of a t-butoxycarbonyl group under acidic conditions are disclosed in, for example, "Synthesis of Organic Compounds IV, The Fifth Series of Experimental Chemistry Vol. 16, Ed. by The Chemical Society of Japan."

Another example of the method of converting the t-butoxycarbonyl group into a carboxyl group is a method in which a cation exchange resin is used instead of the acid described above. Examples of the cation exchange resin include resins having, in their polymer side chains, acid groups such as carboxyl groups (—COOH) and sulfo groups (—$SO_3H$). Of these, a strongly acidic cation exchange resin having sulfo groups in its side chains is preferable because the rate of the reaction can be increased. Examples of the commercial product of the cation exchange resin usable in the present invention include strongly acidic cation exchange resin "Amberlite" manufactured by Organo Corporation. The amount of the cation exchange resin used is preferably within the range of 5 to 200 parts by mass with respect to 100 parts by mass of the polymer represented by general formula (1) above and more preferably within the range of 10 to 100 parts by mass because hydrolysis can be performed effectively.

When the group having an ester bond is a phenylalkoxycarbonyl group such as a benzyloxycarbonyl group, this group can be converted into a carboxyl group through a hydrogenation reduction reaction. In this case, the phenylalkoxycarbonyl group can be reconverted into a carboxyl group quantitatively by performing the reaction using hydrogen as a reducing agent in the presence of a palladium catalyst such as palladium acetate under a reaction condition of room temperature.

As described above, the reaction conditions during conversion into a carboxyl group vary depending on the type of the group having an ester bond. For example, a polymer obtained by copolymerization using t-butyl (meth)acrylate and n-butyl (meth)acrylate as raw materials of $A^3$ has a t-butoxycarbonyl group and a n-butoxycarbonyl group. Under the acidic conditions under which the t-butoxycarbonyl group is hydrolyzed, the n-butoxycarbonyl group is not hydrolyzed, so that only the t-butoxycarbonyl group can be selectively hydrolyzed and converted into a carboxyl group through deprotection. Therefore, the acid value of the hydrophilic block ($A^3$) can be controlled by appropriately selecting, as raw material monomers of $A^3$, monomers each containing a (meth)acrylate having a protecting group that can be reconverted into an anionic group.

It is advantageous in terms of the stability of an aqueous pigment dispersion to be obtained that, in the polymer (A) represented by general formula (1) above, the polymer block ($A^2$) and the polymer block ($A^3$) are distinctly separated from each other. The molar ratio of the polymer block ($A^2$) to the polymer block ($A^3$), $A^2:A^3$, is preferably within the range of 100:10 to 100:500. If the ratio of $A^3$ to $A^2$ is less than 10/100, the dispersion stability of the pigment and the ejection stability during ink ejection tend to deteriorate. If the ratio of $A^3$ to $A^2$ exceeds 500/100, the hydrophilicity of the polymer becomes excessively high. In this case, when paper, for example, is used as a recording medium, the ink easily permeates the recording medium, and this causes deterioration of color development. Particularly, the ratio $A^2:A^3$ is preferably 100:10 to 100:450.

In the polymer (A) represented by general formula (1) above, the number of units of the monomer having an aromatic ring or a heterocycle and forming the polymer block ($A^2$) is preferably within the range of 5 to 40, more preferably within the range of 6 to 30, and most preferably within the range of 7 to 25. The number of anionic groups included in the polymer block ($A^3$) is preferably within the range of 3 to 20, more preferably within the range of 4 to 17, and most preferably within the range of 5 to 15.

When the molar ratio of the polymer block ($A^2$) to the polymer block ($A^3$), $A^2:A^3$, is represented by the molar ratio of the number of moles of the monomer having an aromatic ring or a heterocycle and forming the polymer block ($A^2$) to the number of moles of the anionic groups included in ($A^3$), this ratio is preferably 100:7.5 to 100:400.

The acid value of the polymer (A) represented by general formula (1) above is preferably 40 to 400 mg KOH/g, more preferably 40 to 300 mg KOH/g, and most preferably 40 to 190 mg KOH/g. If the acid value is less than 40 mg KOH/g, the dispersion stability of the pigment and the ejection stability during ink ejection may be insufficient. If the acid value exceeds 400 mg KOH/g, the hydrophilicity of the polymer increases, and the ink easily permeates a recording medium, so that color development deteriorates. When the acid value exceeds 190 mg KOH/g, the water resistance of the ink obtained is affected in some cases.

The acid value of the polymer in the present invention is an acid value obtained by the same acid value measurement method as that for the fine particles of the polymer (A).

(Neutralizer: Basic Compound)

In the aqueous pigment dispersion of the present invention, it is preferable that the anionic groups in the polymer (A) are neutralized.

Any well-known and commonly used basic compound can be used for the basic compound for neutralizing the anionic groups in the polymer (A). For example, inorganic basic materials such as alkali metal hydroxides, e.g., sodium hydroxide and potassium hydroxide, and organic basic compounds such as ammonia, triethylamine, and alkanolamines can be used.

In the present invention, it is not necessary that the degree of neutralization of the polymer (A) present in the aqueous pigment dispersion be 100% with respect to the acid value of the polymer. Specifically, the neutralization is performed such that the degree of neutralization of the polymer (A) is preferably 20% to 200% and more preferably 80% to 150%.
(Pigment)

No particular limitation is imposed on the pigment used in the present invention, and any of organic pigments and inorganic pigments commonly used for aqueous inks for inkjet recording can be used. Untreated pigments and also treated pigments can be used.

Specifically, well-known inorganic and organic pigments can be used. Examples of the inorganic pigments include iron oxides and carbon blacks produced by well-known methods such as a contact method, a furnace method, and a thermal method. Examples of the usable organic pigments include azo pigments (including azo lakes, insoluble azo pigments, condensed azo pigments, chelate azo pigments, etc.), polycyclic pigments (such as phthalocyanine pigments, perylene pigments, perinone pigments, anthraquinone pigments, quinacridone pigments, dioxazine pigments, thioindigo pigments, isoindolinone pigments, and quinophthalone pigments), dye chelates (such as basic dye chelates and acidic dye chelates), nitro pigments, nitroso pigments, and aniline blacks.

Examples of the pigments described above are listed below for each color. Examples of the pigment used for black inks include: No. 2300, No. 2200B, No. 900, No. 960, No. 980, No. 33, No. 40, No. 45, No. 45L, No. 52, HCF88, MA7, MA8, MA100, etc. manufactured by Mitsubishi Chemical Corporation: Raven 5750, Raven 5250, Raven 5000, Raven 3500, Raven 1255, Raven 700, etc. manufactured by Columbian Chemicals Company; Regal 400R, Regal 330R, Regal 660R, Mogul L, Mogul 700, Monarch 800, Monarch 880, Monarch 900, Monarch 1000, Monarch 1100, Monarch 1300, Monarch 1400, etc. manufactured by Cabot Corporation; and Color Black FW1, FW2, FW2V, FW18, FW200, S150, S160, and S170, Printex 35, U, V, and 1400U, Special Black 6, 5, 4, and 4A, NIPEX 150, NIPEX 160, NIPEX 170, NIPEX 180, etc. manufactured by Degussa.

Specific examples of the pigment used for yellow inks include C.I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, 185, etc.

Specific examples of the pigment used for magenta inks include C.I. Pigment Red 5, 7, 12, 48(Ca), 48(Mn), 57(Ca), 57:1, 112, 122, 123, 146, 168, 176, 184, 185, 202, 209, 269, etc. and C.I. Pigment Violet 19 etc.

Specific examples of the pigment used for cyan inks include C.I. Pigment Blue 1, 2, 3, 15, 15:3, 15:4, 16, 22, 60, 63, 66, etc.

Specific examples of the pigment used for white inks include: sulfates and carbonates of alkaline earth metals; silicas such as fine silicic acid powder and synthetic silicates; calcium silicate; alumina; hydrated alumina; titanium oxide; zinc oxide; talc; and clay. The inorganic white pigments may be surface-treated using various surface treatment methods.
(Water)

The water used in the present invention is a dispersion medium of the pigment. The water used can be ultrapure water or pure water such as ion exchanged water, ultrafiltrated water, reverse osmotic water, or distilled water.

Water may be used alone, or a solvent mixture of water and a water-soluble solvent may be used. Examples of the water-soluble solvent include: ketones such as acetone, methyl ethyl ketone, methyl butyl ketone, and methyl isobutyl ketone; alcohols such as methanol, ethanol, 2-propanol, 2-methyl-1-propanol, 1-butanol, and 2-methoxyethanol; ethers such as tetrahydrofuran, 1,4-dioxane, and, 1,2-dimethoxyethane; dimethylformamide; N-methylpyrrolidone; glycols such as ethylene glycol, diethylene glycol, triethylene glycol, tetraethylene glycol, propylene glycol, polyethylene glycol, and polypropylene glycol; diols such as butanediol, pentanediol, hexanediol, and similar diols; glycol esters such as propylene glycol laurate; glycol ethers such as diethylene glycol monoethyl ether, diethylene glycol monobutyl ether, diethylene glycol monohexyl ether, propylene glycol ether, dipropylene glycol ether, and Cellosolves including triethylene glycol ether; alcohols such as methanol, ethanol, isopropyl alcohol, 1-propanol, 2-propanol, 1-butanol, 2-butanol, butyl alcohol, pentyl alcohol, and similar alcohols; sulfolane; lactones such as γ-butyrolactone; lactams such as N-(2-hydroxyethyl)pyrrolidone; glycerin and derivatives thereof; and other various solvents known as water-soluble solvents. One of these water-soluble organic solvents may be used, or a mixture of two or more types may be used.

Preferably, the water-soluble organic solvent used in this case is a high-boiling point water-soluble organic solvent because no solvent removal etc. are necessary in the subsequent steps. Examples of the high-boiling point water-soluble organic solvent include: glycols such as ethylene glycol, diethylene glycol, triethylene glycol, tetraethylene glycol, propylene glycol, polyethylene glycol, and polypropylene glycol; diols such as butanediol, pentanediol, hexanediol, and similar diols; glycol esters such as propylene glycol laurate; glycol ethers such as diethylene glycol monoethyl ether, diethylene glycol monobutyl ether, diethylene glycol monohexyl ether, propylene glycol ether, dipropylene glycol ether, and Cellosolves including triethylene glycol ether; sulfolane; lactones such as γ-butyrolactone; lactams such as N-(2-hydroxyethyl)pyrrolidone; glycerin and derivatives thereof; and other various solvents known as water-soluble solvents. One of these water-soluble organic solvents may be used, or a mixture of two or more types may be used.
(Method of Producing Aqueous Pigment Dispersion)

In the present invention, the aqueous pigment dispersion is an aqueous pigment dispersion before ink preparation in which the pigment is dispersed at a high concentration in water used as the dispersion medium.

The pigment concentration of the aqueous pigment dispersion is adjusted to generally 10 to 50% by mass. When an ink is prepared using the aqueous pigment dispersion, water or an additive is added appropriately according to the desired application and physical properties of the ink. Specifically, by simply diluting the dispersion with water or an additive to a pigment concentration of 0.1 to 20% by mass, the ink can be obtained.

In the present invention, it is preferable that, before dispersed in water used as the dispersion medium, the pigment is dispersed in a mixture of the polymer (A) and a water-soluble organic solvent in advance. Specifically, the polymer (A), the basic compound, and the pigment are mixed well using an agitator or a dispersing device in the presence of the water-soluble organic solvent to render the pigment and the polymer (A) self-water-dispersible, and the dispersion is mixed with water to thereby obtain the aqueous pigment dispersion.

In the present invention, no particular limitation is imposed on the amount of each of the raw materials added. It is preferable that the raw materials are added in the following exemplary ratio.

For example, the polymer (A) is added in an amount of preferably 5 to 200 parts by mass and more preferably 5 to 100 parts by mass with respect to 100 parts by mass of the pigment.

The water-soluble organic solvent is added in an amount of 20 preferably to 200 parts by mass and more preferably 30 to 200 parts by mass with respect to 100 parts by mass of the pigment.

As described above, it is preferable to use the basic compound such that the degree of neutralization of the polymer (A) is 20% to 200%, and it is more preferable to use the basic compound such that the degree of neutralization is 80% to 150%. The degree of neutralization in this case is computed using the following formula, as described above.

Degree of neutralization (%)=((mass (g) of basic compound×56×1,000)/(acid value (mg KOH/g) of polymer (*A*)×equivalent of basic compound× mass (g) of polymer (*A*)))×100     [Formula 3]

In the step of obtaining the dispersion of the basic compound and the pigment in the polymer (A) and the water-soluble organic solvent (hereinafter referred to as step (1)), the basic compound used for the purpose of neutralizing the anionic groups in the polymer (A) may be any of the basic compounds described above.

In this case, the basic compound added may be a 100 percent pure material. However, it is preferable to use an aqueous solution of the basic compound in order to avoid, for example, the risk of heat generation.

The water-soluble organic solvent used in this case is preferably a high-boiling point water-soluble organic solvent because no solvent removal etc. are necessary in the subsequent steps. The water-soluble organic solvent is preferably a water-soluble organic solvent that does not adversely affect ink characteristics after an aqueous ink for inkjet recording is prepared. Preferably, such a water-soluble organic solvent is, for example, any of the high-boiling point water-soluble organic solvents described above.

The dispersion may contain a small amount water, so long as the effects of the present invention are not impaired. The presence of a large amount of water in the initial stage of the pigment dispersing process may cause a reduction in the pigment dispersion efficiency of the polymer (A) and may cause the formation of clusters composed only of the polymer (A). Therefore, it is preferable to use only a small amount of water.

No particular limitation is imposed on the dispersing method in step (1), and a known dispersing method may be used. Examples of the known dispersing method include: a media mill dispersing method that uses media in a paint shaker, a bead mill, a sand mill, a ball mill, etc.; a media-less dispersing method using an ultrasonic homogenizer, a high-pressure homogenizer, a Nanomizer, an Ultimaizer, etc.; and a kneading dispersing method with strong shearing force that uses a roll mill, a Henschel mixer, a pressure kneader, an intensive mixer, a Banbury mixer, a planetary mixer, etc. In the kneading dispersing method, strong shearing force is applied to the high-solid content mixture containing the pigment using a kneader to reduce the size of the pigment particles. The kneading dispersing method is preferred because an aqueous pigment dispersion having a high pigment concentration can be obtained and the amount of coarse particles can be effectively reduced.

When step (1) is performed using the kneading dispersing method, the polymer (A), the basic compound, the water-soluble organic solvent, and the pigment are charged into the kneader and kneaded. No particular limitation is imposed on the order of charging. The whole amount of the raw materials may be charged at once before kneading is started. Each raw material may be added in small portions. The order of charging the raw materials may be changed. For example, the polymer (A), the basic compound, and the pigment may be first charged, and then the water-soluble organic solvent may be charged. The amount of each raw material charged may be changed within the range described above.

To apply the strong shearing force, which is the advantage of the kneading dispersing method, to the mixture, it is preferable to perform kneading on a mixture with a high solid content because a stronger shearing force can be applied to the mixture.

In this case, the shearing force applied to the pigment and the polymer (A) is, for example, preferably 180 MPa or more and more preferably 1,800 MPa or more, which depends on the kneader used. The polymer (A) used in the present invention can remain well dispersed even when strong shearing force is applied thereto, so that an aqueous pigment dispersion with a reduced amount of coarse particles can be obtained.

To apply a higher shearing force, the content of the solids including the pigment and the polymer (A) is 40% by mass or more and more preferably 50% by mass or more.

To increase the concentration of the pigment in the aqueous pigment dispersion to be obtained, it is preferable that the amount of the pigment in the mixture is as large as possible. For example, the amount of the pigment with respect to the total amount of the mixture is preferably 35% by mass or more and more preferably 40% by mass or more.

No particular limitation is imposed on the ratio of the pigment to the polymer (A) contained. The weight ratio is generally 10/0.5 to 10/20 and more preferably 10/0.5 to 10/10.

The water-soluble organic solvent is used in an amount of preferably equal to or more than ⅕ the weight of the pigment and most preferably equal to or more than ⅓.

(Step 2 Dispersion in water)

The dispersion obtained in step 1 is mixed with water (this step is hereinafter referred to as step (2)), whereby an aqueous pigment dispersion containing the pigment and the polymer (A) is obtained.

The dispersion may be added to water. However, it is preferable to add the aqueous medium to the dispersion, because an aqueous pigment dispersion with a uniform particle diameter can be obtained.

No particular limitation is imposed on the method of mixing water. However, when the whole amount of water is added at once and mixed, a uniform aqueous pigment dispersion may not be obtained in some cases. Therefore, it is preferable to add and mix water in small portions. Generally, the dispersing process is performed using a dispersing device.

The dispersing device used in step 2 may be any known dispersing device. Examples of the dispersing device include dispersing devices using media such as a paint shaker, a ball mill, an Attritor, a basket mill, a sand mill, a sand grinder, a DYNO-MILL, a Dispermat, an SC-MILL, a Spike Mill, and an agitator mill. Other examples of the dispersing device include dispersing devices using no media such as an ultrasonic homogenizer, a Nanomizer, a dissolver, a Disper, and a high-speed impeller dispersing device. If necessary, the concentration of the dispersion obtained may be adjusted with a water-soluble solvent.

For a certain type of dispersing device, it is preferable that, before the dispersion obtained is dispersed in water using the dispersing device, a water-soluble organic solvent is further added to and mixed with the dispersion as needed to dilute the dispersion such that the viscosity of the dispersion is adjusted to be suitable for the treatment in the dispersing device (the dispersion with the viscosity adjusted may be referred to as a viscosity-adjusted dispersion). For example, when a sand mill is used, the dispersion is diluted such that the solid concentration is 10 to 40% by mass. In this case, the viscosity of the dispersion is adjusted to several tens to several hundreds of centipoise. Then the sand mill is actuated to perform the dispersing process.

After the water dispersion is obtained in step 2, a centrifugation step or a filtration step may be performed as needed.

In the present application, an aqueous pigment dispersion with water serving as a medium is formed in step 2 through phase inversion emulsification or a similar mechanism.

By performing step (1) and step (2) in the present application in this order, an aqueous pigment dispersion containing a reduced amount of coarse particles can be obtained.

In the thus-obtained aqueous pigment dispersion, it can be inferred that the pigment is stabilized because the polymer (A) encapsulates the pigment or adsorbs part of the pigment.

(Aqueous Ink for Inkjet Recording)

After diluted to a desired concentration, the aqueous pigment dispersion of the present invention can be used for various applications such as the field of coatings for automobiles and buildings, the field of printing inks such as offset inks, gravure inks, flexographic inks, and silk screen inks, and the field of aqueous inks for inkjet recording. Since the amount of coarse particles is reduced, the aqueous pigment dispersion can be used particularly preferably for aqueous inks for inkjet recording.

When the aqueous pigment dispersion of the present invention is used for an aqueous ink for inkjet recording, the aqueous ink is prepared by adding water, a binder resin, etc. to the aqueous pigment dispersion. If necessary, a humectant (drying retarder), a penetrant, or other additives may be added in order to obtain the desired physical properties.

After the preparation of the ink, the ink may be subjected to a centrifugation step or a filtration step.

(Humectant)

The humectant is added for the purpose of preventing drying of the ink. The humectant added for the purpose of preventing drying is contained in the ink in an amount of preferably 3 to 50% by mass. No particular limitation is imposed on the humectant used in the present invention. It is preferable that the humectant is miscible with water and provides the effect of preventing clogging of a head of an inkjet printer. Examples of the humectant include glycerin, ethylene glycol, diethylene glycol, triethylene glycol, polyethylene glycol having a molecular weight of 2,000 or less, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, meso-erythritol, pentaerythritol, sulfolane, lactones such as γ-butyrolactone, lactams such as N-(2-hydroxyethyl)pyrrolidone, and glycerin and derivatives thereof. Particularly, when propylene glycol or 1,3-butanediol is contained, safety is achieved, and advantageous effects such as good drying properties and ejection performance of the ink are obtained.

(Penetrant)

The penetrant is added for the purpose of improving the penetrability into a recording medium and controlling the diameter of dots on the recording medium.

Examples of the penetrant include: lower alcohols such as ethanol and isopropyl alcohol; ethylene oxide adducts of alkyl alcohols such as ethylene glycol hexyl ether and diethylene glycol butyl ether; and propylene oxide adducts of alkyl alcohols such as propylene glycol propyl ether.

The amount of the penetrant contained in the ink is preferably 0.01 to 10% by mass.

(Surfactant)

The surfactant is added to control ink properties such as surface tension. No particular limitation is imposed on the surfactant that can be added for this purpose. Examples of the surfactant include anionic surfactants, nonionic surfactants, cationic surfactants, and amphoteric surfactants. Of these, anionic surfactants and nonionic surfactants are preferred.

Examples of the anionic surfactants include alkylbenzenesulfonates, alkylphenylsulfonates, alkylnaphthalenesulfonates, higher fatty acid salts, sulfuric acid ester salts of higher fatty acid esters, sulfonates of higher fatty acid esters, sulfuric acid ester salts and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates. Specific examples of the anionic surfactants include dodecylbenzenesulfonate, isopropylnaphthalenesulfonate, monobutylphenylphenolmonosulfonate, monobutylbiphenylsulfonate, and dibutylphenylphenoldisulfonate.

Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkyl amines, polyoxyethylene fatty acid amides, fatty acid alkylolamides, alkyl alkanolamides, acetylene glycol, oxyethylene adducts of acetylene glycol, and polyethylene glycol polypropylene glycol block copolymers. Of these, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, and polyethylene glycol polypropylene glycol block copolymers are preferred. Particularly, nonionic surfactants having an HLB within the range of 7 to 20 are preferred because good dissolution stability is obtained.

Other surfactant may be used such as: silicone-based surfactants such as polysiloxane oxyethylene adducts; fluorine-based surfactants such as perfluoroalkyl carboxylates, perfluoroalkyl sulfonates, and oxyethylene perfluoroalkyl ethers; and bio-surfactants such as spiculisporic acid, rhamnolipid, and lysolecithin.

These surfactants may be used alone or as a mixture of two or more types. When a surfactant is added, the amount of the surfactant added is preferably within the range of 0.001 to 2% by mass with respect to the total mass of the ink, more preferably 0.001 to 1.5% by mass, and still more preferably within the range of 0.01 to 1% by mass. If the amount of the surfactant added is less than 0.001% by mass, the effects of the addition of the surfactant tend not to be obtained. If the amount used exceeds 2% by mass, problems such as image smearing tend to occur.

If necessary, a preservative, a viscosity modifier, a pH modifier, a chelating agent, a plasticizer, an antioxidant, an ultraviolet absorber, etc. may be added.

Some water-soluble organic solvents used in step 1 above function as, for example, a humectant or a penetrant. When a water-soluble organic solvent having such a function is used in step 1 described above, it is preferable to add the solvent while its amount is controlled.

The amount of the pigment in the aqueous ink for inkjet recording is preferably 0.1 to 20% by mass, in order to obtain a sufficient image density and to ensure the dispersion stability of the pigment in the ink.

(Recording Medium)

No particular limitation is imposed on the recording medium for the aqueous ink for inkjet recording. The recording medium can be an absorptive recording medium such as copying paper generally used in copiers (PPC paper), a recording medium having an ink absorbing layer, a non-absorptive recording medium having no ink absorbency, a low-absorptive recording medium having low ink absorbency, etc. One feature of the aqueous ink for inkjet recording of the present invention is that good color development is achieved good when recording is performed particularly on a recording medium having an ink absorbing layer, a non-absorptive recording medium, and a low-absorptive recording medium.

Examples of the absorptive recording medium include plain paper, fabric, corrugated cardboards, and wood. Examples of the recording medium having an absorbing layer include inkjet paper. Specific examples of the inkjet paper include PICTORICOPRO Photopaper manufactured by Pictorico.

Examples of the non-absorptive recording medium having no ink absorbency include products used as food packaging materials, and well-known plastic films can be used. Specific examples include: polyester films such as polyethylene terephthalate films and polyethylene naphthalate films; polyolefin films such as polyethylene films and polypropylene films; polyamide-based films such as nylon films; polystyrene films; polyvinyl alcohol films; polyvinyl chloride films; polycarbonate films; polyacrylonitrile films; and polylactic acid films. Particularly, polyester films, polyolefin films, and polyamide-based films are preferred, and polyethylene terephthalate, polypropylene, and nylon are more preferred. The above films may be coated with, for example, polyvinylidene chloride in order to impart barrier properties. Aa film on which a vapor deposited layer of a metal such as aluminum or a metal oxide such as silica or alumina is deposited may also be used as needed.

Each of the plastic films described above may be an unstretched film or may be a uniaxially or biaxially stretched film. The surface of the film may be untreated. However, it is preferable that the film is subjected to treatment such as corona discharge treatment, ozone treatment, low-temperature plasma treatment, flame treatment, glow discharge treatment, etc. in order to improve adhesion.

The thickness of the plastic film is appropriately changed according to its application. For example, when the film is used for a soft packaging application, the thickness of the film is preferably 10 μm to 100 μm so that the film can have flexibility, durability, and curling resistance. The thickness is more preferably 10 μm to 30 μm. Specific examples of such a film include PYLEN (registered trademark) available from TOYOBO Co., Ltd.

Art paper such as printing paper, coated paper, lightweight coated paper, fine coating paper, etc. can be used for the low-absorptive recording medium having low-ink absorbency. Such a low-absorptive recording medium includes a coating layer prepared by applying a coating material to the surface of high-quality paper or acid-free paper that are formed mainly of cellulose and generally not surface-treated. Examples of the low-absorptive recording medium include: fine coating paper such as "OK EVERLIGHT COAT" manufactured by Oji Paper Co., Ltd. and "AURORA S" manufactured by Nippon Paper Industries Co., Ltd.; lightweight coated paper (A3) such as "OK Coat L" manufactured by Oji Paper Co., Ltd. or "AURORA L" manufactured by Nippon Paper Industries Co., Ltd.; coated paper (A2, B2) such as "OK Top Coat+" manufactured by Oji Paper Co., Ltd. and "AURORA Coat" manufactured by Nippon Paper Industries Co., Ltd.; and art paper (A1) such as "OK KINFUJI+" manufactured by Oji Paper Co., Ltd. and "Tokubishi Art" manufactured by Mitsubishi Paper Mills Limited.

EXAMPLES

The present invention will next be described in more detail by way of Examples. However, the present invention is not limited to the following Examples so long as the gist of the invention is observed. In the following Examples, "part" and "%" are based on mass, unless otherwise specified.

Synthesis Examples Of Polymer (A)

Synthesis Example 1 n-Butyllithium (BuLi) used as the polymerization initiator and styrene (St) used as the first monomer were introduced into the T-shaped micromixer M1 in FIG. 1 from the tube reactors P1 and P2 in FIG. 1 and subjected to living anionic polymerization to form a polymer.

Next, the polymer obtained was transferred to the T-shaped micromixer M2 in FIG. 1 thorough a tube reactor R1 in FIG. 1, and a growing end of the polymer was trapped with a reaction control agent (1,1-diphenylethylene (DPE)) introduced from the tube reactor P3 in FIG. 1.

Next, tert-butyl methacrylate (t-BMA) used as the second monomer was introduced into the T-shaped micromixer M3 from the tube reactor P4 in FIG. 1. The second monomer, together with the polymer transferred through a tube reactor R2 in FIG. 1, was subjected to a continuous living anionic polymerization reaction. Then the reaction was quenched with methanol to thereby produce a block copolymer (PA-1).

In this process, the entire microreactor was immersed in a thermostatic bath to set the reaction temperature to 24° C. Each of the monomers and the reaction control agent introduced into the microreactor was dissolved in tetrahydrofuran (THF). The BuLi used was a commercial 2.6M hexane solution, and this solution was diluted with hexane. The molar ratio of the block copolymer (PA-1) was controlled by the dilution concentrations and introduction rates of these diluted solutions as follows.

Molar Ratio of Block Copolymer (PA-1)

Polymerization initiator/first monomer/reaction control agent/second monomer=1.0/13.5/1.0/7.5

The obtained block copolymer (PA-1) was treated with a cation exchange resin to hydrolyze the t-butoxycarbonyl groups in the t-BMA block to thereby reconvert them into carboxyl groups. The reaction solution was subjected to evaporation under reduced pressure, and the solids obtained were pulverized to obtain a powder of polymer (P-1) used as the polymer (A).

The number average molecular weight, acid value, and solubility in water of the polymer (A) obtained, the presence or absence of fine particles when the degree of neutralization is 100%/the average diameter of the particles, and surface tension (dyn/cm) are shown in tables described later.

Synthesis Examples 2 to 12

Polymers (P-2) to (P-12) were produced using the same method as in Synthesis Example 1 except that the type(s) of monomer, the introduction amount(s) thereof, etc. were changed.

Synthesis Example 13

BuLi used as the polymerization initiator and St used as the first monomer were introduced into the T-shaped micromixer M1 in FIG. 1 from the tube reactors P1 and P2 in FIG. 1 and subjected to living anionic polymerization to form a polymer.

Next, the polymer obtained was transferred to the T-shaped micromixer M2 in FIG. 1 thorough the tube reactor R1 in FIG. 1, and a growing end of the polymer was trapped with a reaction control agent (α-methylstyrene (α-MeSt)) introduced from the tube reactor P3 in FIG. 1.

Next, t-BMA used as the second monomer was introduced into the T-shaped micromixer M3 from the tube reactor P4 in FIG. 1. The second monomer, together with the polymer transferred through the tube reactor R2 in FIG. 1, was subjected to a continuous living anionic polymerization reaction. Then the reaction was quenched with methanol to thereby produce a block copolymer (PA-13).

In this process, the entire microreactor was immersed in a thermostatic bath to set the reaction temperature to 24° C. Each of the monomers and the reaction control agent introduced into the microreactor was dissolved in THF. The BuLi used was a commercial 2.6M hexane solution, and this solution was diluted with hexane. The molar ratio of the block copolymer (PA-13) was controlled by the dilution concentrations and introduction rates of these diluted solutions as follows.

Molar Ratio of Block Copolymer (PA-13)

Polymerization initiator/first monomer/reaction control agent/second monomer=1.0/12.0/1.3/8.1

The obtained block copolymer (PA-13) was treated with a cation exchange resin and thereby hydrolyzed. The reaction solution was subjected to evaporation under reduced pressure, and the solids obtained were pulverized to obtain a powder of polymer (P-13).

Synthesis Example 14

A polymer (P-14) was produced using the same method as in Synthesis Example 13 except that the type of monomer, the introduction amount thereof, etc. were changed.

Synthesis Example 15

BuLi used as the polymerization initiator and t-butylstyrene (t-BuSt) used as the first monomer were introduced into the T-shaped micromixer M1 in FIG. 1 from the tube reactors P1 and P2 in FIG. 1 and subjected to living anionic polymerization to form a polymer.

Next, the polymer obtained was transferred to the T-shaped micromixer M2 in FIG. 1 thorough the tube reactor R1 in FIG. 1, and a growing end of the polymer was trapped with a reaction control agent (DPE) introduced from the tube reactor P3 in FIG. 1.

Next, t-BMA used as the second monomer was introduced into the T-shaped micromixer M3 from the tube reactor P4 in FIG. 1. The second monomer, together with the polymer transferred through the tube reactor R2 in FIG. 1, was subjected to a continuous living anionic polymerization reaction. Then the reaction was quenched with methanol to thereby produce a block copolymer (PA-15).

In this process, the entire microreactor was immersed in a thermostatic bath to set the reaction temperature to 24° C. Each of the monomers and the reaction control agent introduced into the microreactor was dissolved in THF. The BuLi used was a commercial 2.6M hexane solution, and this solution was diluted with hexane. The molar ratio of the block copolymer (PA-15) was controlled by the dilution concentrations and introduction rates of these diluted solutions as follows.

Molar ratio of block copolymer (PA-15)

Polymerization initiator/first monomer/reaction control agent/second monomer=1.0/13.3/1.0/8.1

The obtained block copolymer (PA-15) was treated with a cation exchange resin and thereby hydrolyzed. The reaction solution was subjected to evaporation under reduced pressure, and the solids obtained were pulverized to thereby obtain a powder of polymer (PA-15).

The number average molecular weight of the polymer (P-15) was 2,650, and its acid value was 104 mg KOH/g.

Synthesis Example 16

BuLi used as the polymerization initiator and 2-vinylpyridine used as the first monomer were introduced into the T-shaped micromixer M1 in FIG. 1 from the tube reactors P1 and P2 in FIG. 1 and subjected to living anionic polymerization to form a polymer.

Next, the polymer obtained was transferred to the T-shaped micromixer M2 in FIG. 1 thorough the tube reactor R1 in FIG. 1, and a growing end of the polymer was trapped with a reaction control agent (DPE) introduced from the tube reactor P3 in FIG. 1.

1-Ethoxyethyl methacrylate used as the second monomer was introduced into the T-shaped micromixer M3 from the tube reactor P4 in FIG. 1. The second monomer, together with the polymer transferred through the tube reactor R2 in FIG. 1, was subjected to a continuous living anionic polymerization reaction. Then the reaction was quenched with methanol to thereby produce a block copolymer (PA-16).

In this process, the entire microreactor was immersed in a thermostatic bath to set the reaction temperature to 24° C. Each of the monomers and the reaction control agent introduced into the microreactor was dissolved in THF. The BuLi used was a commercial 2.6M hexane solution, and this solution was diluted with hexane. The molar ratio of the block copolymer (PA-16) was controlled by the dilution concentrations and introduction rates of these diluted solutions as follows.

Molar Ratio of Block Copolymer (PA-16)

Polymerization initiator/first monomer/reaction control agent/second monomer=1.0/13.0/1.0/8.0

The obtained block copolymer (PA-16) was treated in a solvent mixture of triethylene glycol and water at 100° C. and thereby hydrolyzed. The water was removed by evaporation under reduced pressure to thereby obtain a triethylene glycol solution of polymer (P-16).

The number average molecular weight of the polymer (P-16) was 2,340, and its acid value was 164 mg KOH/g.

Synthesis Example 17

BuLi used as the polymerization initiator and St used as the first monomer were introduced into the T-shaped micromixer M1 in FIG. 1 from the tube reactors P1 and P2 in FIG. 1 and subjected to living anionic polymerization to form a polymer.

Next, the polymer obtained was transferred to the T-shaped micromixer M2 in FIG. 1 thorough the tube reactor R1 in FIG. 1, and a growing end of the polymer was trapped with a reaction control agent (DPE) introduced from the tube reactor P3 in FIG. 1.

Next, a (50/50)(w/w) solution mixture of t-BMA/tert-butyl acrylate used as the second monomer was introduced into the T-shaped micromixer M3 from the tube reactor P4 in FIG. 1. The second monomer, together with the polymer transferred through the tube reactor R2 in FIG. 1, was subjected to a continuous living anionic polymerization reaction. Then the reaction was quenched with methanol to thereby produce a block copolymer (PA-17).

In this process, the entire microreactor was immersed in a thermostatic bath to set the reaction temperature to 24° C. Each of the monomers and the reaction control agent introduced into the microreactor was dissolved in THF. The BuLi used was a commercial 2.6M hexane solution, and this solution was diluted with hexane. The molar ratio of the block copolymer (PA-17) was controlled by the dilution concentrations and introduction rates of these diluted solutions as follows.

Molar ratio of block copolymer (PA-17)

Polymerization initiator/first monomer/reaction control agent/second monomer=1.0/13.3/1.0/8.1

The obtained block copolymer (PA-17) was treated with a cation exchange resin and thereby hydrolyzed. The reaction solution was subjected to evaporation under reduced pressure, and the solids obtained were pulverized to thereby obtain a powder of polymer (P-17).

The number average molecular weight of the polymer (P-17) was 2,410, and its acid value was 154 mg KOH/g.

Comparative Synthesis Example 1

Synthesis Example of Comparative Example Polymer (PH-1)

(Method of Preparing Random Polymer

A reaction vessel equipped with a stirrer, a dropping unit, and a reflux unit was charged with 100 parts of methyl ethyl ketone, and the reaction vessel was purged with nitrogen under stirring. While the nitrogen atmosphere in the reaction vessel was maintained, temperature was increased to allow the methyl ethyl ketone to reflux, and then a solution mixture of 74 parts of St, 11 parts of acrylic acid, 15 parts of methacrylic acid, and 8 parts of a polymerization initiator ("V-75" manufactured by Wako Pure Chemical Industries, Ltd.) was added dropwise from the dropping unit over 2 hours. The temperature of the reaction system was held at 80° C. at some point during the dropwise addition.

After completion of the dropwise addition, the reaction was continued at 80° C. for 25 hours. During the reaction, the consumption of the raw materials was checked, and the polymerization initiator was added as needed. After completion of the reaction, methyl ethyl ketone was removed by evaporation under reduced presser, and the solids obtained were pulverized to thereby obtain a powder of polymer (PH-1).

The number average molecular weight of the polymer (PH-1) was 5,255, its weight average molecular weight was 9,000, and its acid value was 185 mg KOH/g.

Comparative Synthesis Example 2

Synthesis Example of Comparative Example Polymer (PH-2)

(Method of Preparing Block Polymer in which $A^2$ is Bonded Directly to $A^3$)

A 500-mL eggplant-shaped Schlenk flask with a stirrer placed therein was charged with 200 g of propylene glycol monomethyl ether acetate (hereinafter abbreviated as PGMEA) used as a solvent, 16.9 g of St, and 16 mmol of 2-cyanopropan-2-yl N-methyl-N-(pyridin-4-yl)carbamodithioate used as an RAFT agent. Then nitrogen was bubbled into the solution in the flask at 200 mL/min for one minute. Then the flask was placed in a water bath at 80° C. to increase the inner temperature of the flask to 80° C. Ten minutes after the temperature reached 80° C., a solution composed of 20 g of PGMEA and 4 mmol of a polymerization initiator, 2,2'-azobisisobutyronitrile (AIBN), was supplied all at once to the flask. The resultant mixture was stirred for 5 hours while the temperature was maintained, and then the reaction solution was cooled to room temperature to stop the reaction. Next, 5.61 g of styrene and 8.1 g of acrylic acid were blown into the flask, and the flask was again placed in the water bath at 80° C. to increase the inner temperature of the flask to 80° C.

Ten minutes after the temperature reached 80° C., a solution composed of 20 g of PGMEA and 4 mmol of the polymerization initiator, AIBN, was supplied all at once to the flask. The resultant mixture was stirred for 7 hours while the temperature was maintained, and then the reaction solution was cooled to room temperature to stop the reaction, whereby a polymer (PH-2) was obtained.

Molecular weight measurement was performed by GPC. The number average molecular weight was 2,059, the weight average molecular weight was 2,875, and the dispersity (Mw/Mn) was 1.25. The acid value was measured and found to be 160 (PH-2).

Comparative Synthesis Example 3

Synthesis Example of Comparative Example Polymer (PH-3)

BuLi used as the polymerization initiator and St used as the first monomer were introduced into the T-shaped micromixer M1 in FIG. 1 from the tube reactors P1 and P2 in FIG. 1 and subjected to living anionic polymerization to form a polymer.

Next, the polymer obtained was transferred to the T-shaped micromixer M2 in FIG. 1 thorough the tube reactor R1 in FIG. 1, and a growing end of the polymer was trapped with a reaction control agent (DPE) introduced from the tube reactor P3 in FIG. 1.

Next, t-BMA used as the second monomer was introduced into the T-shaped micromixer M3 from the tube reactor P4 in FIG. 1. The second monomer, together with the polymer transferred through the tube reactor R2 in FIG. 1, was subjected to a continuous living anionic polymerization reaction. Then the reaction was quenched with methanol to thereby produce a block copolymer (PHA-1).

In this process, the entire microreactor was immersed in a thermostatic bath to set the reaction temperature to 24° C. Each of the monomers and the reaction control agent introduced into the microreactor was dissolved in THF. The BuLi used was a commercial 2.6M hexane solution, and this solution was diluted with hexane. The molar ratio of the block copolymer (PHA-1) was controlled by the dilution concentrations and introduction rates of these diluted solutions as follows.

Molar Ratio of Block Copolymer (PHA-1)

Polymerization initiator/first monomer/reaction control agent/second monomer=1.0/44.0/1.0/20.0

The obtained block copolymer (PHA-1) was treated with a cation exchange resin and thereby hydrolyzed. The reaction solution was subjected to evaporation under reduced pressure, and the solids obtained were pulverized to thereby obtain a powder of polymer (PH-3).

The number average molecular weight of the polymer (PH-3) was 6,600, and its acid value was 151 mg KOH/g.

Comparative Synthesis Example 4

Synthesis Example of Comparative Example Polymer (PH-4)

BuLi used as the polymerization initiator and St used as the first monomer were introduced into the T-shaped micromixer M1 in FIG. 1 from the tube reactors P1 and P2 in FIG. 1 and subjected to living anionic polymerization to form a polymer.

Next, the polymer obtained was transferred to the T-shaped micromixer M2 in FIG. 1 thorough the tube reactor R1 in FIG. 1, and a growing end of the polymer was trapped with a reaction control agent (1,1,-diphenylethylene) introduced from the tube reactor P3 in FIG. 1.

Next, t-BMA used as the second monomer was introduced into the T-shaped micromixer M3 from the tube reactor P4 in FIG. 1. The second monomer, together with the polymer transferred through the tube reactor R2 in FIG. 1, was subjected to a continuous living anionic polymerization reaction. Then the reaction was quenched with methanol to thereby produce a block copolymer (PHA-2).

In this process, the entire microreactor was immersed in a thermostatic bath to set the reaction temperature to 24° C. Each of the monomers and the reaction control agent introduced into the microreactor was dissolved in THF. The BuLi used was a commercial 2.6M hexane solution, and this solution was diluted with hexane. The molar ratio of the block copolymer (PHA-2) was controlled by the dilution concentrations and introduction rates of these diluted solutions as follows.

Molar Ratio of Block Copolymer (PHA-2)

Polymerization initiator/first monomer/reaction control agent/second monomer=1.0/65.0/1.0/37.1

The obtained block copolymer (PHA-2) was treated with a cation exchange resin and thereby hydrolyzed. The reaction solution was subjected to evaporation under reduced pressure, and the solids obtained were pulverized to thereby obtain a powder of polymer (PH-4).

The number average molecular weight of the polymer (PH-4) was 9,330, and its acid value was 195 mg KOH/g.

(Methods of Measuring Physical Properties of Polymers)

The physical properties of each of the polymers (A) obtained were measured as follows.

(Method of Measuring Number Average Molecular Weight (Mn) and Weight Average Molecular Weight (Mw))

The measurement was performed by gel permeation chromatography (GPC) under the following conditions.

Measurement device: High performance GPC ("HLC-8220GPC" manufactured by TOSOH Corporation)

Columns: The following columns manufactured by TOSOH Corporation were connected in series and used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (refractive index detector)
Column temperature: 40° C.
Eluent: tetrahydrofuran (THF)
Flow rate: 1.0 mL/min
Injection amount: 100 μL (THF solution with a sample concentration of 0.4% by mass)
Standard samples: The following polystyrene standards were used to produce a calibration curve.

(Polystyrene Standards)
"TSKgel standard polystyrene A-500" manufactured by TOSOH Corporation
"TSKgel standard polystyrene A-1000" manufactured by TOSOH Corporation
"TSKgel standard polystyrene A-2500" manufactured by TOSOH Corporation
"TSKgel standard polystyrene A-5000" manufactured by TOSOH Corporation
"TSKgel standard polystyrene F-1" manufactured by TOSOH Corporation
"TSKgel standard polystyrene F-2" manufactured by TOSOH Corporation
"TSKgel standard polystyrene F-4" manufactured by TOSOH Corporation
"TSKgel standard polystyrene F-10" manufactured by TOSOH Corporation
"TSKgel standard polystyrene F-20" manufactured by TOSOH Corporation
"TSKgel standard polystyrene F-40" manufactured by TOSOH Corporation
"TSKgel standard polystyrene F-80" manufactured by TOSOH Corporation
"TSKgel standard polystyrene F-128" manufactured by TOSOH Corporation
"TSKgel standard polystyrene F-288" manufactured by TOSOH Corporation
"TSKgel standard polystyrene F-550" manufactured by TOSOH Corporation (Method of Measuring Acid Value)

The measurement was performed according to JIS test method K 0070-1992. Specifically, 0.5 g of a sample was dissolved in a THF solvent, and titration with a 0.1M alcoholic potassium hydroxide solution was performed using phenolphthalein as an indicator to determine the acid value.

(Method of Measuring Solubility in Water)

0.5 g of a polymer screened using sieves with mesh sizes of 250 μm and 90 μm so that its particle diameter fell within the range of 250 μm to 90 μm was sealed in a bag produced from a 400-mesh wire net, immersed in 50 mL of water, and left under mild stirring at a temperature of 25° C. for 24 hours. After immersion for 24 hours, the 400-mesh wire net with the polymer sealed therein was dried in a dryer set at 110° C. for 2 hours to dry the polymer. The change in weight of the 400-mesh wire net with the polymer sealed therein before and after immersion in water was measured, and the solubility was computed using the following formula.

Solubility (g/100 mL)=(polymer-sealed 400-mesh wire net before immersion (g)−polymer-sealed 400-mesh wire net after immersion (g))×2    [Formula 4]

(Method of Determining Formation of Fine Particles in Water and Method of Measuring Average Particle Diameter (Nm))

(1) The acid value of a polymer was determined using the method of measuring the acid value described above.

(2) 1 g of the polymer was added to 50 mL of water, and a 0.1 mol/L aqueous potassium hydroxide solution was added in an amount sufficient to completely neutralize the polymer with the acid value determined in (1) to thereby obtain a completely neutralized polymer.

(3) The completely neutralized solution was subjected to ultrasonic waves at a temperature of 25° C. for 2 hours using an ultrasonic cleaner (ultrasonic cleaner US-102, SND Co., Ltd., 38 kHz, self-excited oscillation) and was then left to stand at room temperature for 24 hours.

After the solution was left to stand for 24 hours, a sample solution was sampled at a depth of 2 cm from the surface of the solution. Then, using a dynamic light scattering particle diameter measurement device ("Microtrac particle size distribution analyzer UPA-ST150" manufactured by NIKKISO Co., Ltd.), a determination was made as to whether or not information about light scattering due to formation of fine particles was obtained, whereby the presence or absence of fine particles was checked.

At the same time, the average particle diameter was measured.

(Method of Measuring Surface Tension)

The same sample solution as that obtained in the method of determining the formation of fine particles in water was used, and a value measured using a Wilhelmy surface tension meter was used as the surface tension.

The raw materials, reaction conditions, and physical properties of each of the polymers obtained in the above Synthesis Examples and Comparative Synthesis Examples are shown in tables.

TABLE 1

|  |  | Synthesis Example 1 | Synthesis Example 2 | Synthesis Example 3 | Synthesis Example 4 | Synthesis Example 5 | Synthesis Example 6 |
| --- | --- | --- | --- | --- | --- | --- | --- |
| Polymer (A) |  | P-1 | P-2 | P-3 | P-4 | P-5 | P-6 |
| Reaction temperature |  | 24° C. | 24° C. | 24° C. | 24° C. | 24° C. | 24° C. |
| Initiator | Type | BuLi | BuLi | BuLi | BuLi | BuLi | BuLi |
|  | Molar ratio | 1.0 | 1.0 | 1.0 | 1.0 | 1.0 | 1.0 |
| First monomer | Type | St | St | St | St | St | St |
|  | Molar ratio | 13.5 | 11.5 | 33.3 | 13.5 | 13.6 | 13.3 |
| Reaction control agent | Type | DPE | DPE | DPE | DPE | DPE | DPE |
|  | Molar ratio | 1.0 | 1.0 | 1.0 | 1.0 | 1.0 | 1.0 |
| Second monomer | Type | tBMA | tBMA | tBMA | tBMA/nBMA | tBMA/nBMA | tBMA |
|  | Molar ratio | 7.5 | 9.5 | 17.6 | 17.5/13.1 | 5.7/1.9 | 8.1 |
| Molar ratio of first block to second block | $A^2:A^3 =$ | 100:56 | 100:83 | 100:53 | 100:227 | 100:56 | 100:61 |
| Molecular weight (number average molecular weight) |  | 2501 | 1880 | 5344 | 4760 | 2672 | 2317 |
| Acid value | mgKOH/g | 145 | 187 | 142 | 146 | 113 | 145 |
| Solubility in water (g/100 mL) |  | 0.0021 | 0.0065 | 0.0012 | 0.0043 | 0.0011 | 0.0034 |
| Fine particles at degree of neutralization of 100%/average particle diameter (nm) |  | Yes/325 | Yes/150 | Yes/650 | Yes/30 | Yes/420 | Yes/344 |
| Surface tension (dyn/cm) |  | 67.3 | 61.2 | 69.5 | 58.3 | 65.5 | 66.6 |

TABLE 2

|  |  | Synthesis Example 7 | Synthesis Example 8 | Synthesis Example 9 | Synthesis Example 10 | Synthesis Example 11 | Synthesis Example 12 |
| --- | --- | --- | --- | --- | --- | --- | --- |
| Polymer (A) |  | P-7 | P-8 | P-9 | P-10 | P-11 | P-12 |
| Reaction temperature |  | 24° C. | 24° C. | 24° C. | 24° C. | 24° C. | 24° C. |
| Initiator | Type | BuLi | BuLi | BuLi | BuLi | BuLi | BuLi |
|  | Molar ratio | 1.0 | 1.0 | 1.0 | 1.0 | 1.0 | 1.0 |
| First monomer | Type | St | St | St | St | St | St |
|  | Molar ratio | 7.8 | 24.6 | 9.0 | 4.0 | 9.2 | 4.0 |
| Reaction control agent | Type | DPE | DPE | DPE | DPE | DPE | DPE |
|  | Molar ratio | 1.0 | 1.0 | 1.0 | 1.0 | 1.0 | 1.0 |
| Second monomer | Type | tBMA | tBMA | tBMA | tBMA | tBMA/nBMA | tBMA/nBMA |
|  | Molar ratio | 5.2 | 13.9 | 13.0 | 17.0 | 8.1/4.1 | 8.1/9.2 |
| Molar ratio of first block to second block | $A^2:A^3 =$ | 100:67 | 100:57 | 100:144 | 100:425 | 100:133 | 100:433 |
| Molecular weight (number average molecular weight) |  | 1407 | 3756 | 2396 | 2330 | 2133 | 2445 |
| Acid value | mgKOH/g | 125 | 123 | 193 | 285 | 138 | 146 |
| Solubility in water (g/100 mL) |  | 0.0035 | 0.0022 | 0.027 | 0.023 | 0.0082 | 0.0065 |
| Fine particles at degree of neutralization of 100%/average particle diameter (nm) |  | Yes/20 | Yes/450 | Yes/13 | Yes/62 | Yes/14 | Yes/11 |
| Surface tension (dyn/cm) |  | 54.4 | 70.2 | 37.5 | 39.0 | 55.0 | 30.6 |

TABLE 3

|  |  | Synthesis Example 13 | Synthesis Example 14 |
|---|---|---|---|
| Name of resin |  | P-13 | P-14 |
| Reaction temperature |  | 24° C. | 24° C. |
| Initiator | Type | BuLi | BuLi |
|  | Molar ratio | 1.0 | 1.0 |
| First monomer | Type | St | St |
|  | Molar ratio | 12.0 | 12.0 |
| Reaction control agent | Type | α-MeSt | α-MeSt |
|  | Molar ratio | 1.3 | 2.0 |
| Second monomer | Type | tBMA | tBMA |
|  | Molar ratio | 8.1 | 8.1 |
| Molar ratio of first block to second block | $A^2:A^3 =$ | 100:68 | 100:76 |
| Molecular weight (number average molecular weight) |  | 2382 | 2471 |
| Acid value | mgKOH/g | 145 | 148 |
| Solubility in water (g/100 mL) |  | 0.0084 | 0.0056 |
| Fine particles at degree of neutralization of 100%/average particle diameter (nm) |  | Yes/82 | Yes/48 |
| Surface tension (dyn/cm) |  | 66.2 | 67.7 |

TABLE 4

|  | PH-1 | PH-2 | PH-3 | PH-4 |
|---|---|---|---|---|
| Molecular weight (number average molecular weight) | 5255 | 2059 | 6600 | 9330 |
| Acid value mgKOH/g | 185 | 160 | 151 | 195 |
| Solubility in water (g/100 mL) | 0.031 | 0.17 | <0.0010 | <0.0010 |
| Fine particles at degree of neutralization of 100%/average particle diameter (nm) | No | Yes/10 | Yes/1300 | Yes/1500 |
| Surface tension (dyn/cm) | 45.0 | 42.6 | 70.5 | 70.9 |
| Water contact angle (°) | 49.6 | 32.6 | 48.0 | 49.5 |

In Tables 1 to 4,
BuLi stands for n-butyllithium,
St stands for styrene,
DPE stands for 1,1-diphenylethylene,
αMeSt stands for αmethylstyrene,
tBMA stands for tert-butyl methacrylate, and
nBMA stands for n-butyl methacrylate.

Examples

Methods of Producing Aqueous Pigment Dispersions

An aqueous pigment dispersion was obtained by any of the methods in the following Production Examples. The amounts of the raw materials used are described in tables described later.

Production Example 1

Method of Producing Aqueous Pigment Dispersion Using Atmospheric Pressure Kneader In the following description, the composition in Example 1 is used as an example.

Step 1 was performed. Specifically, a 0.2 L atmospheric pressure kneader (manufactured by Advance Co., Ltd.) was charged with 120 parts of a phthalocyanine-based pigment FASTOGEN Blue Pigment (C.I. Pigment 15:3, manufactured by DIC Corporation) used as the pigment and 36 parts of the polymer (P-1) used as the polymer (A), and mixing was performed at a jacket temperature of 80° C. (blade rotation speed: 40 rpm). Then 52 parts of diethylene glycol used as the water-soluble solvent and 15 parts of a 34% aqueous potassium hydroxide solution used as the basic compound were added, and kneading was performed for 1 hour.

Next, step 2 was performed. Specifically, 360 parts of ion exchanged water was gradually added to the kneaded product in the container under continuous stirring, and then a solution mixture of 68 parts of diethylene glycol and 149 parts of ion exchanged water (the amount of ion exchanged water was adjusted such that the total amount of the ion exchanged water and 15 parts of the 34% aqueous potassium hydroxide solution added previously was 164 parts) was added and mixed. An aqueous pigment dispersion (C1) with a pigment concentration of 15.0% was thereby obtained.

Production Example 2

Method of Producing Aqueous Pigment Dispersion Using Paint Conditioner

In the following description, the composition in Example 15 is used as an example.

Step 1 was performed. Specifically, 4 parts of a phthalocyanine-based pigment FASTOGEN Blue Pigment (C.I. Pigment 15:3, manufactured by DIC Corporation) used as the pigment, 1.2 parts of the polymer (P-1) used as the polymer (A), 4 parts of methyl ethyl ketone, 0.45 parts of a 34% aqueous potassium hydroxide solution used as the basic compound, and 17 parts of ion exchanged water were dispersed using a paint conditioner (zirconia beads were used, media diameter: 0.5 mm) for 2 hours.

Next, step 2 was performed. Specifically, the zirconia beads were removed from the solution, and the methyl ethyl ketone in the resultant solution was removed by evaporation using an evaporator. Then 4 parts of diethylene glycol used as a water-soluble solvent was added. An aqueous pigment dispersion (C15) with a pigment concentration of 15.0% was thereby obtained.

Production Example 3

Method of Producing Aqueous Pigment Dispersion Using Intensive Mixer

In the following description, the composition in Example 20 is used as an example.

Step 1 was performed. Specifically, a 1.0 L intensive mixer (Nippon Eirich Co., Ltd.) was charged with 150 parts of a phthalocyanine-based pigment FASTOGEN Blue Pigment (C.I. Pigment 15:3, manufactured by DIC Corporation) used as the pigment, 45 parts of the polymer (P-6) used as the polymer (A), 95 parts of triethylene glycol used as the water-soluble solvent, and 19 parts of a 34% aqueous potassium hydroxide solution. Then kneading was performed at a rotor peripheral speed of 2.94 m/s and a pan peripheral speed of 1 m/s for 25 minutes.

Next, step 2 was performed. Specifically, 450 parts of ion exchanged water was gradually added to the kneaded product in the container of the intensive mixer under continuous stirring, and a solution mixture of 55 parts of triethylene glycol used as a water-soluble solvent and 186 parts of ion exchanged water was added and mixed. An aqueous pigment dispersion (C20) with a pigment concentration of 15.0% was thereby obtained.

(Evaluation Methods)

Each of the aqueous pigment dispersions obtained above was evaluated by measuring the following items.

<Volume Average Particle Diameter>

One of the aqueous pigment dispersions produced was diluted 5,000 fold, and measurement was performed using Microtrac UPA-150 (manufactured by NIKKISO Co., Ltd.). The average of three measured values was used.

<Number of Coarse Particles>

One of the aqueous pigment dispersions produced was diluted 2,000 fold, and measurement was performed using AccuSizer 780APS (manufactured by International business). The measured number of coarse particles was converted to the number of particles per 1 mL in the aqueous pigment dispersion before dilution. The unit of the number of particles in each table is ($\times 10^6$/mL).

In the present invention, an aqueous pigment dispersion with the number of coarse particles exceeding $80 \times 10^6$/mL was rated fail.

<Absorbance>

One of the aqueous pigment dispersions produced was diluted 10,000 fold, and measurement was performed using an ultraviolet and visible spectrophotometer V-600 (manufactured by JASCO Corporation). The maximum absorption wavelength was used as the measurement wavelength. For a black pigment dispersion with no maximum absorption wavelength, a value at 500 nm was used as the absorbance.

<Ejectability and Color Development>

To measure ink ejection characteristics and the optical density of a printed object, aqueous inks for inkjet recording for evaluation were produced using the aqueous pigment dispersions produced as follows.

Each of the aqueous inks was prepared by using the following components in the listed amounts based on 100 parts of the total mass of the components. Since the produced aqueous pigment dispersions differed in pigment concentration, the amount of the aqueous pigment dispersion used was adjusted such that the final concentration of the pigment was 5% by mass.

Aqueous pigment dispersion: about 5 parts (content of pigment)
Triethylene glycol monobutyl ether: 8 parts
2-Pyrrolidone: 8 parts
Glycerin: 3 parts
Surfynol 440 (manufactured by Air Products and Chemicals, Inc.): 0.5 parts
Pure water: balance Each of the produced aqueous inks for inkjet recording was tested using an inkjet printer (EM-930C manufactured by SEIKO EPSON CORPORATION). After a cartridge was filled with the ink, a nozzle check pattern was printed. Then, printing was performed in a single color mode on PICTORICOPRO Photopaper (manufactured by Pictorico) and OK Top Coat+ (manufactured by Oji Paper Co., Ltd.). Specifically, the printing was performed in a 340 $cm^2$ area on each of the A4 sheets at a print density setting of 100%. Then the nozzle check test pattern was again printed. The nozzle conditions were compared before and after the test to check whether or not the number of clogged nozzles increased to thereby evaluate ejectability.

In addition, the density of the surface printed at a print density of 100% was measured using "SpectroScan" (manufactured by X-Rite) and used to evaluate color development.

<Water Resistance>

To measure the water resistance of an inkjet-printed object, aqueous inks for inkjet recording for evaluation were produced using the aqueous pigment dispersions produced as follows.

Each of the aqueous inks was prepared by using the following components in the listed amounts based on 100 parts of the total mass of the components. Since the produced aqueous pigment dispersions differed in pigment concentration, the amount of the aqueous pigment dispersion used was adjusted such that the final concentration of the pigment was 5% by mass.

Aqueous pigment dispersion: about 5 parts (content of pigment)
Propylene glycol: 15 parts
1,3-Butanediol: 10 parts
Surfynol 440: 0.50 parts
Pure water: balance One of the produced aqueous inks for inkjet recording was spread over a 10 mm-wide cut coated paper sheet using a No. 4 bar coater. The resultant coated paper sheet was immersed in 10 mL of pure water such that an area of 40 mm×10 mm was immersed. The coated paper sheet was left to stand for 10 minutes, and then the degree of color loss was evaluated using absorbance.

The method of producing each of the aqueous pigment dispersions, their compositions, and their evaluated characteristics are shown in tables below.

TABLE 5

| Cyan aqueous pigment dispersion | Example 1 | Example 2 | Example 3 | Example 4 | Example 5 |
| --- | --- | --- | --- | --- | --- |
| Production Example | 1 | 1 | 1 | 1 | 1 |
| Type of pigment | PB.15:3 | PB.15:3 | PB.15:3 | PB.15:3 | PB.15:3 |
| Amount of pigment (parts) | 120 | 120 | 120 | 120 | 120 |
| Type of polymer (A) | P-1 | P-2 | P-3 | P-4 | P-1 |
| Amount of polymer (A) (parts) | 36 | 36 | 36 | 36 | 24 |
| Acid value of polymer (A) | 145 | 187 | 142 | 146 | 145 |
| Weight ratio of polymer (A)/pigment | 0.3 | 0.3 | 0.3 | 0.3 | 0.2 |
| Step 1 | | | | | |
| Type of water-soluble solvent | DEG | DEG | DEG | DEG | DEG |
| Amount of water-soluble solvent (parts) | 52 | 52 | 52 | 52 | 52 |
| Amount of KOH (parts) | 15 | 20 | 15 | 15 | 10 |
| Step 2 | | | | | |
| Dispersion medium: First mixing (Figures are in parts) | Water = 360 | Water = 360 | Water = 360 | Water = 360 | Water = 360 |

TABLE 5-continued

| | | | | | |
|---|---|---|---|---|---|
| Dispersion medium: Second mixing (Figures are in parts) | DEG:Water = 68/149 | DEG:Water = 68/149 | DEG:Water = 68/149 | DEG:Water = 68/149 | DEG:Water = 68/166 |
| Volume-based average particle diameter of aqueous pigment dispersion (nm) | 109 | 106 | 128 | 146 | 118 |
| Number of coarse particles equal to or larger than 1.0 μm (×10$^6$/mL) | 9 | 5 | 70 | 60 | 75 |
| Color development on PICTORICOPRO Photopaper | 2.41 | 2.42 | 2.42 | 2.40 | 2.35 |
| Color development on OK Top Coat+ | 1.80 | 1.80 | 1.70 | 1.75 | 1.75 |
| Ejectability | Good | Good | Good | Good | Good |
| Absorbance of dispersion | 0.863 | 0.875 | 0.879 | 0.871 | 0.859 |

| Cyan aqueous pigment dispersion | Example 6 | Example 7 | Example 8 | Example 9 |
|---|---|---|---|---|
| Production Example | 1 | 1 | 1 | 1 |
| Type of pigment | PB.15:3 | PB.15:3 | PB.15:3 | PB.15:3 |
| Amount of pigment (parts) | 120 | 120 | 120 | 120 |
| Type of polymer (A) | P-1 | P-5 | P-6 | P-7 |
| Amount of polymer (A) (parts) | 48 | 36 | 36 | 36 |
| Acid value of polymer (A) | 145 | 102 | 145 | 125 |
| Weight ratio of polymer (A)/pigment | 0.4 | 0.3 | 0.3 | 0.3 |
| Step 1 | | | | |
| Type of water-soluble solvent | DEG | DEG | DEG | DEG |
| Amount of water-soluble solvent (parts) | 52 | 52 | 52 | 52 |
| Amount of KOH (parts) | 20 | 11 | 15 | 13 |
| Step 2 | | | | |
| Dispersion medium: First mixing (Figures are in parts) | Water = 360 | Water = 360 | Water = 360 | Water = 360 |
| Dispersion medium: Second mixing (Figures are in parts) | DEG:Water = 68/132 | DEG:Water = 68/153 | DEG:Water = 68/149 | DEG:Water = 68/151 |
| Volume-based average particle diameter of aqueous pigment dispersion (nm) | 113 | 110 | 106.2 | 106 |
| Number of coarse particles equal to or larger than 1.0 μm (×10$^6$/mL) | 40 | 9 | 9 | 18 |
| Color development on PICTORICOPRO Photopaper | 2.40 | 2.35 | 2.47 | 2.31 |
| Color development on OK Top Coat+ | 1.80 | 1.80 | 1.84 | 1.70 |
| Ejectability | Good | Good | Good | Good |
| Absorbance of dispersion | 0.863 | 0.884 | 0.888 | 0.839 |

TABLE 6

| Cyan aqueous pigment dispersion | Example 10 | Example 11 | Example 12 | Example 13 | Example 14 | Example 15 |
|---|---|---|---|---|---|---|
| Production Example | 1 | 1 | 1 | 1 | 1 | 2 |
| Type of pigment | PB.15:3 | PB.15:3 | PB.15:3 | PB.15:3 | PB.15:3 | PB.15:3 |
| Amount of pigment (parts) | 120 | 120 | 120 | 120 | 120 | 4 |
| Type of polymer (A) | P-8 | P-9 | P-10 | P-11 | P-12 | P-1 |
| Amount of polymer (A) (parts) | 36 | 36 | 36 | 36 | 36 | 1.2 |
| Acid value of polymer (A) | 123 | 193 | 285 | 137.7 | 146 | 128 |
| Weight ratio of polymer (A)/pigment | 0.3 | 0.3 | 0.3 | 0.3 | 0.3 | 0.3 |
| Step 1 | | | | | | |
| Type of water-soluble solvent | DEG | DEG | DEG | DEG | DEG | MEK/Water |
| Amount of water-soluble solvent (parts) | 52 | 52 | 52 | 52 | 52 | 4/17 |
| Amount of KOH (parts) | 13 | 20 | 30 | 15 | 15 | 0.45 |
| Step 2 | | | | | | |
| Dispersion medium: First mixing (Figures are in parts) | Water = 360 | Water = 360 | Water = 360 | Water = 360 | Water = 360 | Water = 0 |

TABLE 6-continued

| Cyan aqueous pigment dispersion | Example 10 | Example 11 | Example 12 | Example 13 | Example 14 | Example 15 |
|---|---|---|---|---|---|---|
| Dispersion medium: Second mixing (Figures are in parts) | DEG:Water = 68/151 | DEG:Water = 68/144 | DEG:Water = 68/134 | DEG:Water = 68/149 | DEG:Water = 68/149 | DEG = 4 |
| Volume-based average particle diameter (nm) | 137.3 | 112.1 | 113.9 | 120.4 | 110 | 109 |
| Number of coarse particles equal to or larger than 1.0 μm (×10$^6$/mL) | 50 | 8 | 5 | 55 | 7 | 9 |
| Color development on PICTORICOPRO Photopaper | 2.10 | 2.27 | 2.17 | 2.26 | 2.26 | 2.40 |
| Color development on OK Top Coat+ | 1.62 | 1.80 | 1.64 | 1.69 | 1.76 | 1.80 |
| Ejectability | Good | Good | Good | Good | Good | Good |
| Absorbance of dispersion | 0.786 | 0.831 | 0.808 | 0.859 | 0.856 | 0.863 |

TABLE 7

| Cyan aqueous pigment dispersion | Example 16 | Example 17 | Example 18 | Example 19 |
|---|---|---|---|---|
| Production Example | 1 | 1 | 2 | 2 |
| Type of pigment | PB.15:3 | PB.15:3 | PB.15:3 | PB.15:3 |
| Amount of pigment (parts) | 120 | 120 | 4 | 4 |
| Type of polymer (A) | P-13 | P-14 | P-13 | P-14 |
| Amount of polymer (A) (parts) | 36 | 36 | 1.2 | 1.2 |
| Acid value of polymer (A) | 145 | 148 | 145 | 148 |
| Weight ratio of polymer (A)/pigment | 0.3 | 0.3 | 0.3 | 0.3 |
| Step 1 | | | | |
| Type of water-soluble solvent | DEG | DEG | MEK/Water | MEK/Water |
| Amount of water-soluble solvent (parts) | 52 | 52 | 4/17 | 4/17 |
| Amount of KOH (parts) | 15 | 16 | 0.45 | 0.45 |
| Step 2 | | | | |
| Dispersion medium: First mixing (Figures are in parts) | Water = 360 | Water = 360 | Water = 0 | Water = 0 |
| Dispersion medium: Second mixing (Figures are in parts) | DEG:Water = 68/149 | DEG:Water = 68/148 | DEG = 4 | DEG = 4 |
| Volume-based average particle diameter (nm) | 116 | 134 | 112 | 130 |
| Number of coarse particles equal to or larger than 1.0 μm (×10$^6$/mL) | 5 | 35 | 6 | 30 |
| Optical density OD (no binder: PICT) | 2.28 | 2.29 | 2.28 | 2.29 |
| Optical density OD (no binder: OK Top Coat+) | 1.75 | 1.8 | 1.75 | 1.8 |
| Ejectability | Good | Good | Good | Good |
| Absorbance of dispersion | 0.824 | 0.889 | 0.822 | 0.891 |

TABLE 8

| Cyan aqueous pigment dispersion | Example 20 | Example 21 |
|---|---|---|
| Production Example | 3 | 3 |
| Type of pigment | PB15:3 | PB15:3 |
| Amount of pigment (parts) | 150 | 150 |
| Type of polymer (A) | P-6 | P-14 |
| Amount of polymer (A) (parts) | 45 | 45 |
| Acid value of polymer (A) | 145 | 148 |
| Weight ratio of polymer (A)/pigment | 0.3 | 0.3 |
| Step 1 | | |
| Type of water-soluble solvent | TEG | TEG |
| Amount of water-soluble solvent (parts) | 95 | 150 |
| Amount of KOH (parts) | 19 | 20 |
| Step 2 | | |
| Dispersion medium: First mixing (Figures are in parts) | Water = 450 | Water = 450 |
| Dispersion medium: Second mixing (Figures are in parts) | TEG:Water = 55/186 | TEG:Water = 0/185 |
| Volume-based average particle diameter of aqueous pigment dispersion (nm) | 120.5 | 110.5 |
| Number of coarse particles equal to or larger than 1.0 μm (×10$^6$/mL) | 41 | 28 |
| Color development on PICTORICOPRO Photopaper | 2.29 | 2.32 |
| Color development on OK Top Coat+ | 1.77 | 1.89 |
| Ejectability | Good | Good |
| Absorbance of dispersion | 0.816 | 0.804 |

TABLE 9

| Cyan aqueous pigment dispersion | Comparative Example 1 | Comparative Example 2 | Comparative Example 3 | Comparative Example 4 |
|---|---|---|---|---|
| Production Example | 1 | 1 | 1 | 1 |
| Type of pigment | PB.15:3 | PB.15:3 | PB.15:3 | PB.15:3 |
| Amount of pigment (parts) | 120 | 120 | 120 | 120 |
| Type of polymer (A) | PH-1 | PH-2 | PH-3 | PH-4 |
| Amount of polymer (A) (parts) | 36 | 36 | 36 | 36 |
| Acid value of polymer (A) | 185 | 160 | 151 | 195 |
| Weight ratio of polymer (A)/pigment | 0.3 | 0.3 | 0.3 | 0.3 |
| Step 1 | | | | |
| Type of water-soluble solvent | DEG | DEG | DEG | DEG |
| Amount of water-soluble solvent (parts) | 52 | 52 | 52 | 52 |
| Amount of KOH (parts) | 20 | 17 | 20 | 17 |
| Step 2 | | | Polymer precipitated in step 1, not dispersible | |
| Dispersion medium: First mixing (Figures are in parts) | Water = 360 | Water = 360 | — | — |
| Dispersion medium: Second mixing (Figures are in parts) | DEG:Water = 68/144 | DEG:Water = 68/147 | — | — |
| Volume-based average particle diameter (nm) | 106 | 138.8 | — | — |
| Number of coarse particles equal to or larger than 1.0 μm (×10$^6$/mL) | 90 | 136 | — | — |
| Color development on PICTORICOPRO Photopaper | 2.00 | 2.00 | — | — |
| Color development on OK Top Coat+ | 1.60 | 1.65 | — | — |
| Ejectability | Poor | Poor | — | — |
| Absorbance of dispersion | 0.7911 | 0.860 | — | — |

The abbreviations in the tables are as follows.

PB. 15:3: phthalocyanine-based pigment FASTOGEN Blue Pigment (C.I. Pigment 15:3 manufactured by DIC Corporation)

KOH: 34% aqueous potassium hydroxide solution

DEG: diethylene glycol

TEG: triethylene glycol

Water: ion exchanged water

As can be seen from the results, in Examples 1 to 21 in which the polymers (A) used are represented by general formula (1), the number of coarse particles was equal to or less than 80×10$^6$/mL, and all the pigment dispersions and inks obtained were excellent in color development and ejectability.

Comparative Example 1 is an example in which the polymer used is a random polymer that does not form fine particles in water when the degree of neutralization of the anionic groups with the basic compound is 100%. In this case, the number of coarse particles exceeded 80×10$^6$/ml, and the ejectability was poor.

Comparative Example 2 is an example of the block polymer in which A$^2$ and A$^3$ are directly bonded to each other without α-methylstyrene or 1,1-diphenylethylene. This block polymer has a solubility in water of more than 0.1 g/100 mL. In this case, the number of coarse particles exceeded 80×10$^6$/ml, and the ejectability was poor.

Comparative Examples 3 and 4 are examples in which the polymer used has a number average molecular weight of more than 6,000. In this case, the polymer precipitated in step 1, and it was difficult to continue the dispersing process.

(Results of Water Resistance Evaluation Test)

A water resistance test was performed for Examples 8, 11, and 12. The results showed that, when the acid value of the polymer (A) used is high, the water resistance is slightly low. Therefore, it is effective to use a polymer (A) having a low acid value for applications that require water resistance.

TABLE 10

| Cyan aqueous pigment dispersion | Example 8 | Example 11 | Example 12 |
|---|---|---|---|
| Type of polymer (A) | P-6 | P-9 | P-10 |
| Acid value of polymer (A) | 145 | 193 | 285 |
| Water resistance (absorbance) | 0.001 or less | 0.409 | 0.782 |

In addition to the cyan color described above, aqueous pigment dispersions using yellow, magenta, and black pigments were similarly evaluated. The results are shown in Tables 11 to 13.

TABLE 11

| Yellow aqueous pigment dispersion | Example 22 | Example 23 |
|---|---|---|
| Production Example | 3 | 3 |
| Type of pigment | PY74 | PY74 |
| Amount of pigment (parts) | 150 | 150 |
| Type of polymer (A) | P-6 | P-14 |
| Amount of polymer (A) (parts) | 45 | 45 |
| Acid value of polymer (A) | 145 | 148 |
| Weight ratio of polymer (A)/pigment | 0.3 | 0.3 |
| Step 1 | | |
| Type of water-soluble solvent | TEG | TEG |
| Amount of water-soluble solvent (parts) | 91 | 150 |
| Amount of KOH (parts) | 19 | 20 |
| Step 2 | | |
| Dispersion medium: First mixing (Figures are in parts) | Water = 450 | Water = 450 |

TABLE 11-continued

| Yellow aqueous pigment dispersion | Example 22 | Example 23 |
|---|---|---|
| Dispersion medium: Second mixing (Figures are in parts) | TEG:Water = 59/186 | TEG:Water = 0/185 |
| Volume-based average particle diameter of aqueous pigment dispersion (nm) | 86.5 | 67.6 |
| Number of coarse particles equal to or larger than 1.0 μm (×10$^6$/mL) | 36 | 7 |
| Color development on PICTORICOPRO Photopaper | 1.38 | 1.46 |
| Color development on OK Top Coat+ | 1.17 | 1.21 |
| Ejectability | Good | Good |
| Absorbance of dispersion | 0.967 | 1.091 |

TABLE 12

| Magenta aqueous pigment dispersion | Example 24 | Example 25 | Example 26 | Example 27 |
|---|---|---|---|---|
| Production Example | 3 | 3 | 3 | 3 |
| Type of pigment | PR122 | PR122 | PR269 | PR269 |
| Amount of pigment (parts) | 50 | 150 | 150 | 150 |
| Type of polymer (A) | P-6 | P-14 | P-6 | P-14 |
| Amount of polymer (A) (parts) | 10 | 30 | 45 | 45 |
| Acid value of polymer (A) | 195 | 145 | 144.9 | 146.8 |
| Weight ratio of polymer (A)/pigment | 0.2 | 0.2 | 0.3 | 0.3 |
| Step 1 | | | | |
| Type of water-soluble solvent | TEG | TEG | TEG | TEG |
| Amount of water-soluble solvent (parts) | 28 | 150 | 225 | 225 |
| Amount of KOH (parts) | 1.95 | 4.37 | 6.5 | 6.6 |
| Step 2 | | | | |
| Dispersion medium: First mixing (Figures are in parts) | Water = 450 | Water = 450 | Water = 450 | Water = 450 |
| Dispersion medium: Second mixing (Figures are in parts) | TEG:Water = 6.80/97.82 | TEG:Water = 0/42.84 | TEG:Water = 0/13.2 | TEG:Water = 0/10.85 |
| Volume-based average particle diameter of aqueous pigment dispersion (nm) | 174.7 | 136.4 | 154.6 | 180.6 |
| Number of coarse particles equal to or larger than 1.0 μm (×10$^6$/mL) | 4 | 2 | 3 | 1.1 |
| Color development on PICTORICOPRO Photopaper | 1.66 | 1.84 | 2.03 | 2.14 |
| Color development on OK Top Coat- | 1.07 | 1.21 | 1.62 | 1.68 |
| Ejectability | Good | Good | Good | Good |
| Absorbance of dispersion | 0.439 | 0.448 | 0.967 | 0.954 |

TABLE 13

| Black aqueous pigment dispersion | Example 28 | Example 29 |
|---|---|---|
| Production Example | 3 | 3 |
| Type of pigment | PB7 | PB7 |
| Amount of pigment (parts) | 150 | 150 |
| Type of polymer (A) | P-6 | P-14 |
| Amount of polymer (A) (parts) | 45 | 45 |
| Acid value of polymer (A) | 145 | 148 |
| Weight ratio of polymer (A)/pigment | 0.3 | 0.3 |
| Step 1 | | |
| Type of water-soluble solvent | TEG | TEG |
| Amount of water-soluble solvent (parts) | 165 | 225 |
| Amount of KOH (parts) | 19 | 20 |
| Step 2 | | |
| Dispersion medium: First mixing (Figures are in parts) | Water = 450 | Water = 450 |
| Dispersion medium: Second mixing (Figures are in parts) | TEG:Water = 0/171 | TEG:Water = 0/110 |
| Volume-based average particle diameter of aqueous pigment dispersion (nm) | 77.2 | 74.3 |
| Number of coarse particles equal to or larger than 1.0 μm (×10$^6$/mL) | 10 | 7 |
| Color development on PICTORICOPRO Photopaper | 2.59 | 2.53 |
| Color development on OK Top Coat+ | 1.84 | 1.86 |
| Ejectability | Good | Good |
| Absorbance of dispersion | 0.639 | 0.685 |

The abbreviations in the tables are as follows.
PY74: Pigment Yellow 74
PR122: Pigment Red 122
PR269: Pigment Red 269
PB7: Pigment Black 7

KOH: 34% aqueous potassium hydroxide solution
DEG: diethylene glycol
TEG: triethylene glycol
Water: ion exchanged water As can be seen from the results the results, in Examples 22 to 29 in which the polymers used are represented by general formula (1), the number of coarse particles was equal to or less than $80\times10^6$/mL, and all the pigment dispersions and inks were excellent in color development and ejectability.

BRIEF DESCRIPTION OF DRAWING

FIG. 1 is a schematic diagram of the microreactor used in the present invention.

REFERENCE SIGNS LIST

1: T-shaped micromixer M1
2: T-shaped micromixer M2
3: T-shaped micromixer M3
4: tube reactor R1
5: tube reactor R2
6: tube reactor R3
7: tube reactor P1 for precooling
8: tube reactor P2 for precooling
9: tube reactor P3 for precooling
10: tube reactor P4 for precooling

The invention claimed is:

1. An aqueous pigment dispersion comprising a pigment, water, and a polymer (A), wherein the polymer (A) is capable of a solubility in water of 0.1 g/100mL or less when not neutralized, and capable of forming fine particles in water when neutralized to 100%, wherein the polymer (A) has a number average molecular weight within the range of 1,000 to 6,000 and polymer (A) is represented by general formula (1):

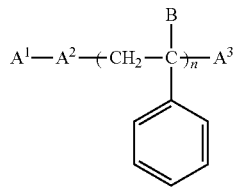

(1)

wherein, in formula (1), A1 represents an organic lithium initiator residue, A2 represents a polymer block of styrene, A3 represents a polymer block containing an anionic group, n represents an integer of 1 to 5, and B represents an aromatic group or an alkyl group;
wherein the polymer (A) has an acid value within the range of 40 to 190 mg KOH/g, and wherein the degree of neutralization of the anionic group with a basic compound of the polymer (A) is 20% to 200%.

2. The aqueous pigment dispersion according to claim 1, wherein in the polymer (A) represented by general formula (1):

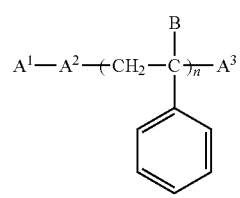

(1)

$A^3$ is a polymer block including at least one monomer block having an anionic group or composed only of monomer blocks each having an anionic group, the anionic group being a group reconverted from a protecting group in a monomer containing a (meth)acrylate having the protecting group, the protecting group being capable of being reconverted into the anionic group by deprotection.

3. The aqueous pigment dispersion according to claim 1, wherein the polymer (A) is obtained by living anionic polymerization using a microreactor.

4. An aqueous ink for inkjet recording that contains the aqueous pigment dispersion according to claim 1.

5. A method of producing an aqueous pigment dispersion, the method comprising the successive steps of: obtaining a dispersion containing a polymer having an anionic group, a basic compound, a water-soluble organic solvent, and a pigment; and mixing water with the dispersion; wherein the polymer having the anionic group is polymer (A) represented by general formula (1):

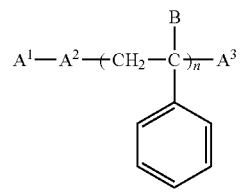

(1)

wherein, in formula (1), $A^1$ represents an organic lithium initiator residue, $A^2$ represents a polymer block of a styrene, $A^3$ represents a polymer block containing the anionic group, n represents an integer of 1 to 5, and B represents an aromatic group or an alkyl group,
wherein the polymer (A) has an acid value within the range of 40 to 190 mg KOH/g,
wherein the polymer (A) is capable of a solubility in water of 0.1 g/100 mL or less when not neutralized, and capable of forming fine particles in water when neutralized to 100%, wherein the polymer (A) has a number average molecular weight within the range of 1,000 to 6,000, and
wherein the polymer (A) forms fine particles in water when the degree of neutralization of the anionic group with a basic compound is 20% to 200%.

6. The aqueous pigment dispersion according to claim 1, wherein B is selected from the group consisting of diphenylethylene, α-methylstyrene, and p-methyl-α-methyl styrene.

7. The method according to claim 5, herein B is selected from the group consisting of diphenylethylene, α-methylstyrene, and p-methyl-α-methylstyrene.

* * * * *